(12) United States Patent
Bertrand

(10) Patent No.: US 7,069,135 B2
(45) Date of Patent: Jun. 27, 2006

(54) ESTIMATING MAXIMUM FRICTION COEFFICIENT BASED ON KNOWLEDGE OF THE LOADS AND SELF-ALIGNMENT TORQUE GENERATED IN A TIRE CONTACT ZONE

(75) Inventor: David Bertrand, Chamalieres (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 57 days.

(21) Appl. No.: 10/911,048

(22) Filed: Aug. 4, 2004

(65) Prior Publication Data
US 2005/0065699 A1 Mar. 24, 2005

Related U.S. Application Data

(63) Continuation of application No. PCT/EP03/01176, filed on Feb. 6, 2003.

(30) Foreign Application Priority Data
Feb. 8, 2002 (FR) .................................. 02 01597

(51) Int. Cl.
G06F 7/00 (2006.01)
G06F 17/00 (2006.01)
(52) U.S. Cl. .................. 701/80; 701/73; 303/148; 303/149
(58) Field of Classification Search .................. 701/80, 701/73, 74; 73/146; 303/148, 149, 150
See application file for complete search history.

(56) References Cited

U.S. PATENT DOCUMENTS 5,964,265 A   10/1999   Becherer
6,550,320 B1   4/2003   Giustino
6,597,980 B1 *  7/2003   Kogure ........................ 701/80

FOREIGN PATENT DOCUMENTS

DE   3939917   6/1991
EP   0 0937 615   8/1999

OTHER PUBLICATIONS

U.S. Patent Application 2002 011093 of Matsuno, published Jan. 2002.

* cited by examiner

Primary Examiner—Yonel Beaulieu
(74) Attorney, Agent, or Firm—Fitzpatrick, Cella, Harper & Scinto

(57) ABSTRACT

A method for estimation of the maximum grip coefficient on the basis of knowledge of the forces and the self-alignment torque which are generated in the contact area of a tire, includes the steps of:
  selecting a plurality of fixed points in space, which lie at different azimuths along the circumference in at least one sidewall of the tire,
  carrying out a corresponding number of measurements of circumferential distance variation (extension or contraction) at these fixed points when the tire is rolling on the road,
  processing the measurement signals so as to extract the three components of a resultant of forces which are exerted by the road on the contact area of a tire and the self-alignment torque generated by the tire from them,
  processing the evaluation signals of the three components of a resultant of forces which are exerted by the road on the contact area of a tire and of the self-alignment torque generated by the tire so as to extract the said grip coefficient $\mu$ from them.

15 Claims, 17 Drawing Sheets

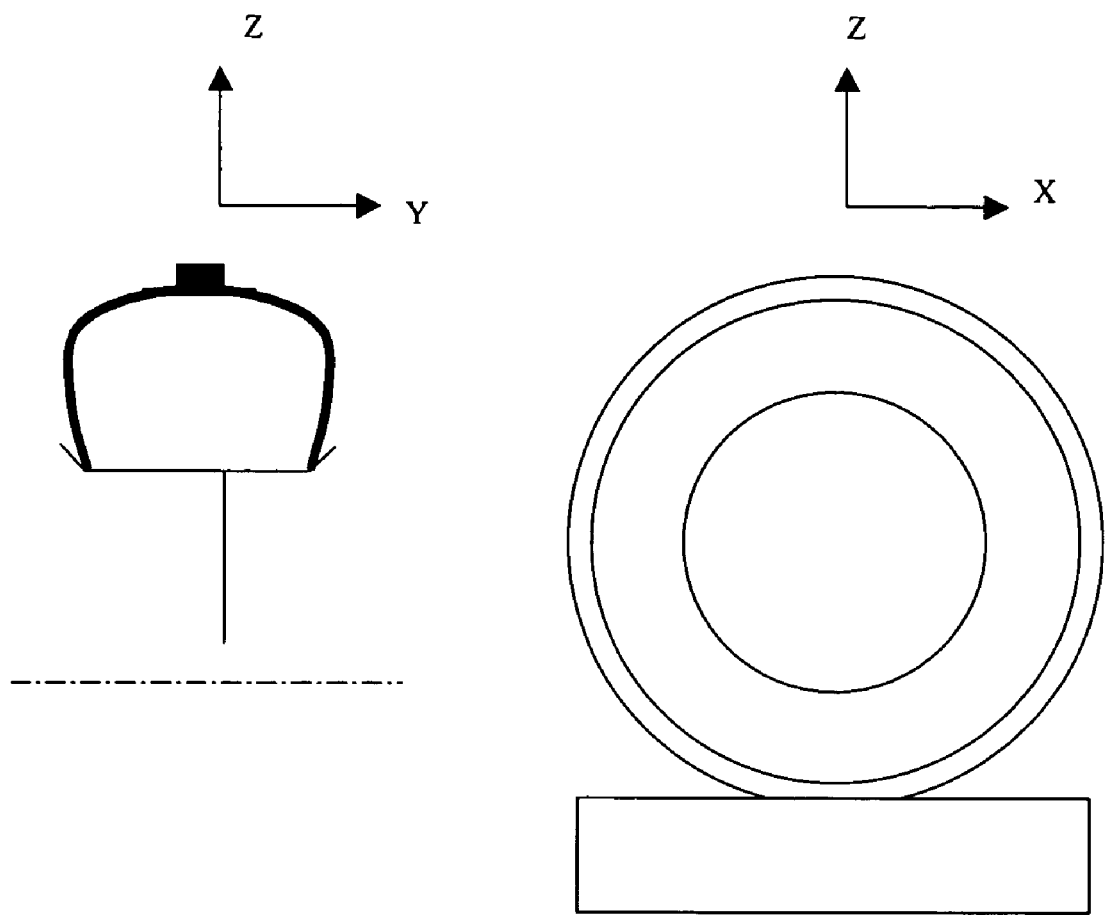

ESTIMATING MAXIMUM FRICTION COEFFICIENT BASED ON KNOWLEDGE OF THE LOADS AND SELF-ALIGNMENT TORQUE GENERATED IN A TIRE CONTACT ZONE

CROSS-REFERENCE TO RELATED APPLICATIONS

This application is a continuation of International Application No. PCT/EP03/01176, filed Feb. 6, 2003.

BACKGROUND AND SUMMARY OF THE INVENTION

The present invention relates to the evaluation of the grip of a vehicle on a road, and more particularly to the determination of characteristics of force and grip in the contact area between the road and a vehicle wheel fitted with an elastic tire, such as an inflated tire or a non-pneumatic elastic tire, which rolls on the road.

The present invention also relates to the various electronic assistance devices used, for example, for antilock control of the brakes of a vehicle or antiskid control of the drive wheels, control of the trajectory of a vehicle or alternatively for other forms of control or monitoring, for instance the tire pressures. It is known that such devices reconstruct the grip coefficient ($\mu$) of the tires on the road by calculation, without having carried out any measurement either of the grip coefficient or of the forces developed in the contact of the tires with the ground. Even though these devices provide significant assistance and extra safety, their operation would benefit greatly from the use of a measured value, or a value estimated on the basis of real measurements carried out on the tire during operation.

For this reason, it is an object of the present invention to provide a way of evaluating the forces involved in the contact of the vehicle on the road, and a way of evaluating the grip of a vehicle on a road. The invention relates more particularly to the determination of characteristics of forces and the grip between the road and a vehicle wheel, or a tire or an elastic tire, these terms being regarded as equivalent in the context of the present invention.

The various electronic assistance devices mentioned above would therefore usefully benefit from "real-time" indications of the forces and the grip conditions liable to affect the handling of a vehicle, especially when it undergoes an acceleration due to a driving force or a braking force, or due to a change of direction of movement. The invention aims to provide a method of achieving this efficiently.

In what follows, "maximum grip potential" refers to the ratio between the maximum tangential force (transverse or longitudinal, or both combined) and the normal force which the wheel can experience without slipping. In the text, this is also denoted by the term "maximum grip coefficient", or the letter $\mu$.

"Overall forces" refers to the three components of forces Fx, Fy and Fz applied to the center of the wheel, and the self-alignment torque N about the Z-axis.

With a view to estimating the maximum grip potential, it has been proposed that the tread of a tire, or certain specially adapted elements of the tread, be fitted with sensors intended to measure or estimate the forces generated locally, in particular under slip conditions. Although highly promising, these approaches nevertheless require that a sensor be made to operate in the tread of the tire, and in particular that it be made to operate preferably throughout the life of the tire.

Furthermore, the estimates provided by these sensors are local and therefore highly sensitive to the surface condition of the road.

Moreover, since the intention is actually to estimate the maximum grip potential of the wheel, this still remains to be determined on the basis of the measured local potential.

The invention described in detail here differs from these local approaches. It can be used to supplement them or replace them. The invention proposes to use a measurement of the overall deformations of the tire so as to obtain information about the maximum grip potential of the wheel on the ground. Indeed, when the tire is subjected to a constraint, the point of application of the forces being applied in the contact area depends, inter alia, on the maximum grip coefficient because, as soon as a part of the contact area of the wheel on the road is slipping, its contribution to the tangential forces is saturated at a level which depends on the grip coefficient. The deformations of the tire are themselves sensitive to the movement of this point of application. In particular, the circumferential extension of the sidewalls, which is sensitive to the applied forces, is also sensitive to the movement of the point of application of the forces in the contact area.

The proposed method uses measurements of the circumferential deformations of the sidewall at certain azimuths of the tire in order to allow estimation of the forces and the maximum grip coefficient.

The invention provides a method of determining the grip coefficient $\mu$ in the contact area of a tire on a road, including the following steps:

determining the three components of a resultant of forces which are exerted by the road on the contact area of a tire and the self-alignment torque generated by the tire, processing the evaluation signals of the three components of a resultant of forces which are exerted by the road on the contact area of a tire and of the self-alignment torque generated by the tire so as to extract the said grip coefficient $\mu$ from them.

The following description furthermore provides a way of determining the three components of a resultant of forces which are exerted by the road on the contact area of a tire and the self-alignment torque generated by the tire, including the following steps:

selecting a plurality of fixed points in space, which lie at different azimuths along the circumference in at least one sidewall of the tire, carrying out a corresponding number of measurements of circumferential distance variation (extension or contraction) at these fixed points when the tire is rolling on the road, processing the measurement signals so as to extract the three components of a resultant of forces which are exerted by the road on the contact area of a tire and the self-alignment torque generated by the tire from them, processing the evaluation signals of the three components of a resultant of forces which are exerted by the road on the contact area of a tire and of the self-alignment torque generated by the tire so as to extract the said grip coefficient $\mu$ from them.

This determination is not indispensable, however, and the estimation of the grip coefficient $\mu$ proposed below could be carried out on the basis of values of the three components of a resultant of forces which are exerted by the road on the contact area of a tire and of the self-alignment torque generated by the tire which are obtained in a different way.

In order to provide a good estimate of $\mu$, the method requires that there be a slip zone in the contact area, which may be created either by a special design of the tire or by a sufficient level of constraint applied to the tire. In order to obtain reliable information even when there is little slipping, it is proposed that the percentage potential used be estimated in addition to the maximum grip potential. The reason is that this quantity has the advantage of being easier to estimate as an absolute value, even for small constraints.

The method of the invention is based on recognition of the fact that the forces acting between the tread of the tire and the road cause a substantial and reproducible deformation in the form of a circumferential extension or contraction of the sidewalls of the tires. This circumferential extension or contraction, if it is possible to measure it individually during rotation of the tire in real time, can make it possible to ascertain at each instant the direction and magnitude of the forces acting on the tire, as well as the sign and the magnitude of the self-alignment torque exerted by the tire and the grip coefficient of the tire on the road.

By its very design and the way in which it functions, the deformations generated in the tire when it is constrained also depend on its inflation pressure. The inflation pressure is therefore advantageously one of the parameters used and/or processed in the method proposed here. This pressure may be known by using a specific measurement means which is independent of the measurements taken in the context of this invention, an example of such a means being a pressure sensor. This pressure may also be obtained by specific processing of the measurement of the circumferential deformations.

Under actual conditions of use, the tire is frequently subjected to variations in the camber angle. This leads to a modification of the deformations of the tire. The camber is therefore advantageously one of the parameters of the method proposed here. The camber may be known by using a specific measurement means which is independent of the measurements taken in the context of this invention, an example of such a means being a camber angle sensor. This camber may also be obtained by specific processing of the measurement of the circumferential deformations.

According to one particular but interesting aspect, the invention proposes to estimate the circumferential contraction or extension of the sidewalls by measuring the distance between the cords or threads of the carcass ply in the sidewalls. It is also possible to measure the distance between wires (for example two of them) which are placed in the sidewalls to form a sensor and experience movements correlated with those of the threads of the carcass ply. Measurement of the "thread separation" will be referred to below. It should be noted that, although this term is linked with the radial structure of a tire, the method applies not just to tires with a radial carcass. For instance, the term "thread separation" will be used to denote the average distance between two lines made on the sidewall at adjoining but different azimuths.

It should be noted that, in the event that the circumferential extension of the sidewalls is being measured within the sidewalls at a position different from their flexurally neutral fiber, the circumferential extension will include a component due to the flexure of the sidewall, in particular when passing through the contact area (a phenomenon also referred to as "bellying"). This component due to flexure is by no means a problem, and it can be exploited in order to increase the dynamic range of variation of the signals which the invention uses, by carrying out the extension measurement elsewhere than on the flexurally neutral fiber.

BRIEF DESCRIPTION OF THE DRAWINGS

The rest of the description explains the invention in more detail with the aid of the appended figures, in which:

FIG. 2 is a front view of a schematic tire for explanation of the invention;

FIG. 3 is a side view of a schematic tire for explanation of the invention;

Figure 11A:
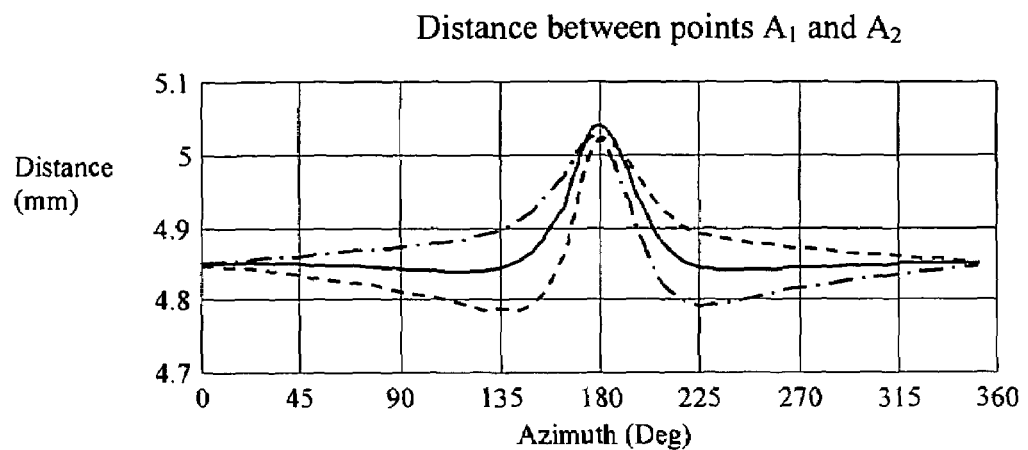
Figure 11B:
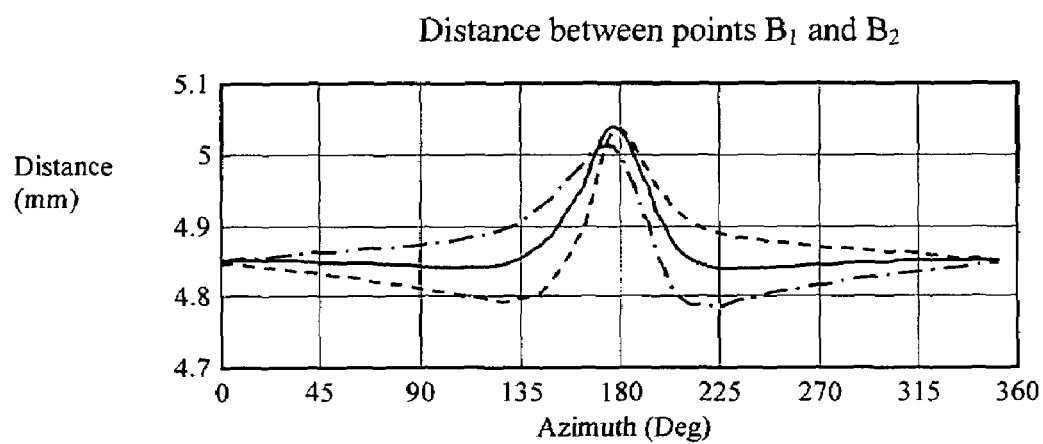
Figure 12A:
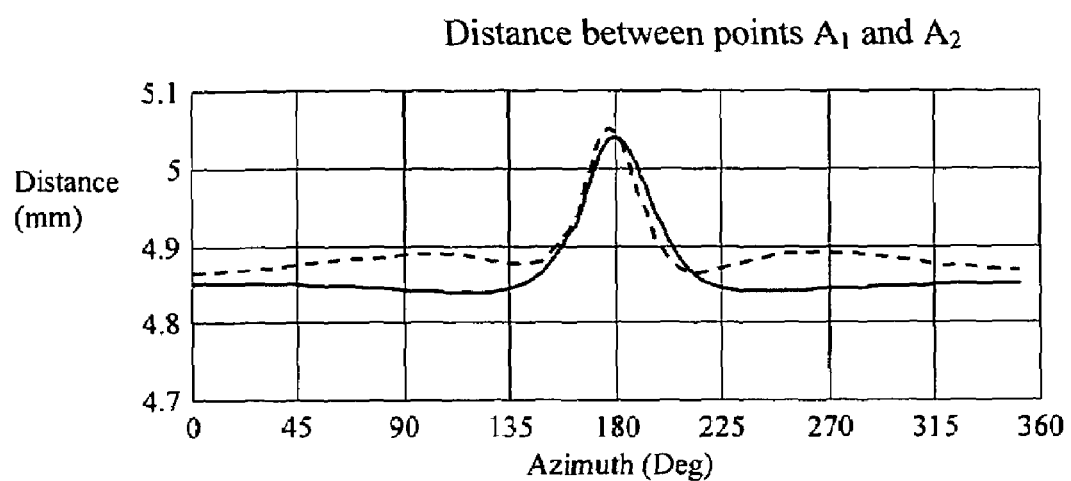
Figure 12B:
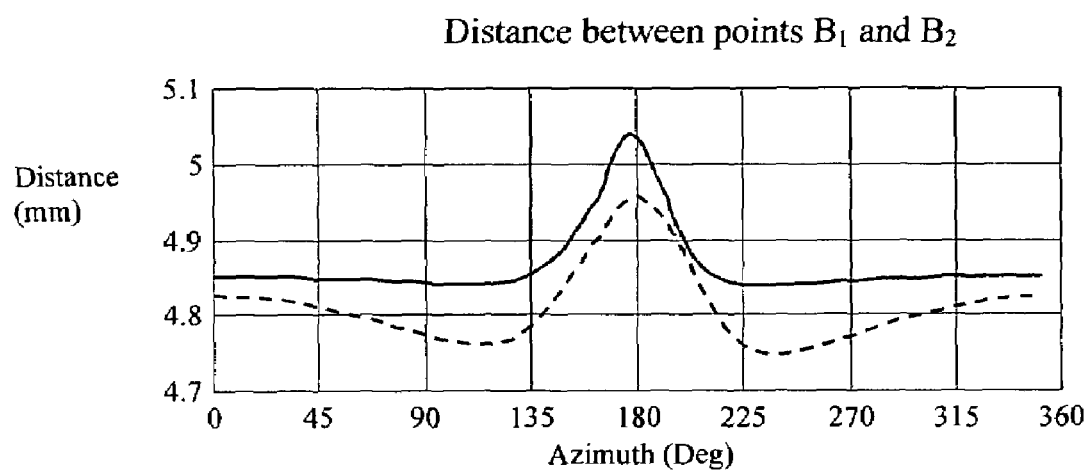
Figure 13:
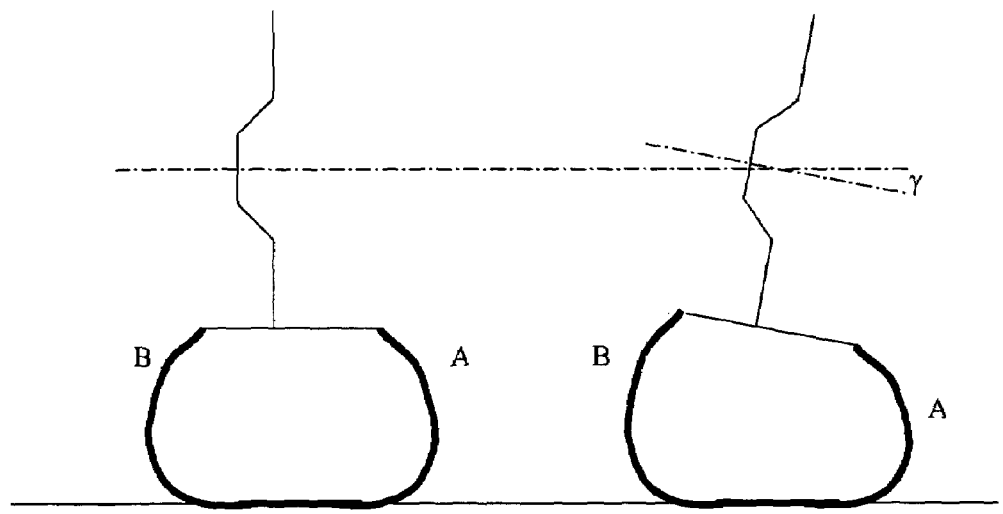
Figure 14A:
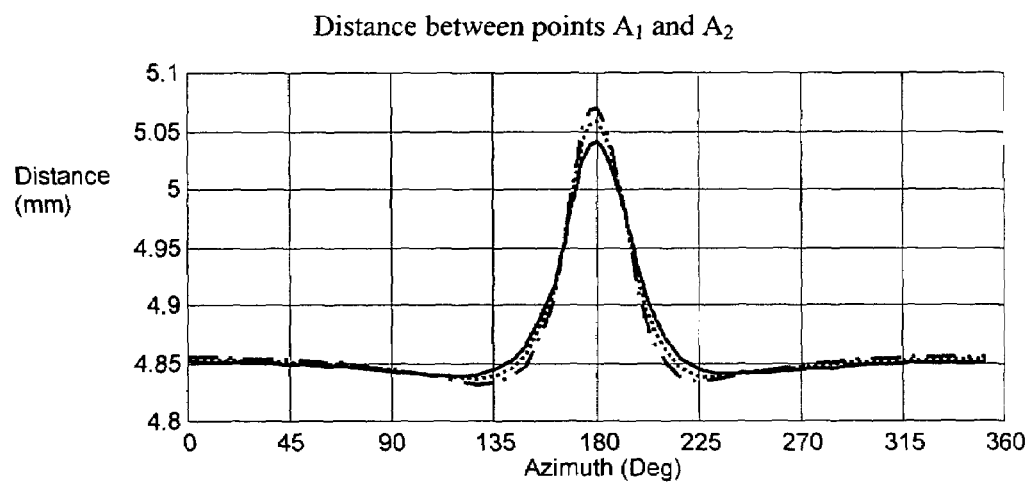
Figure 14B:
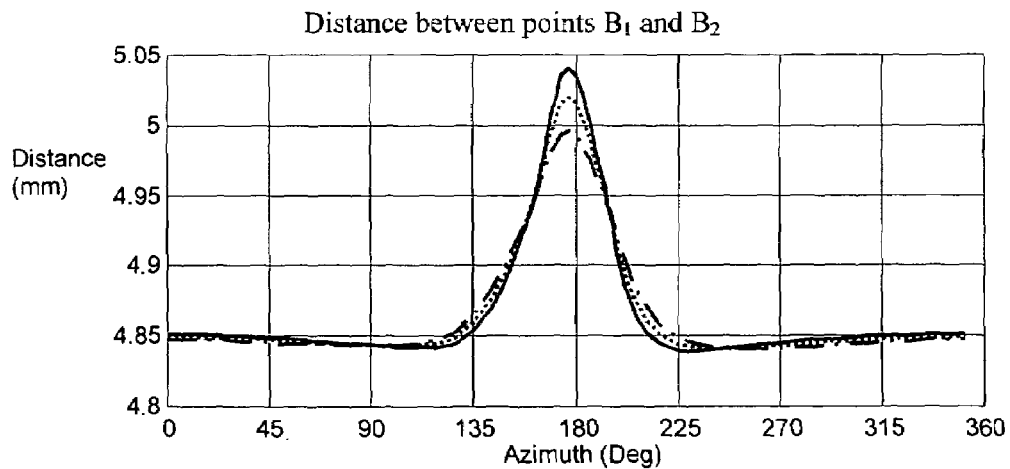
Figure 15:
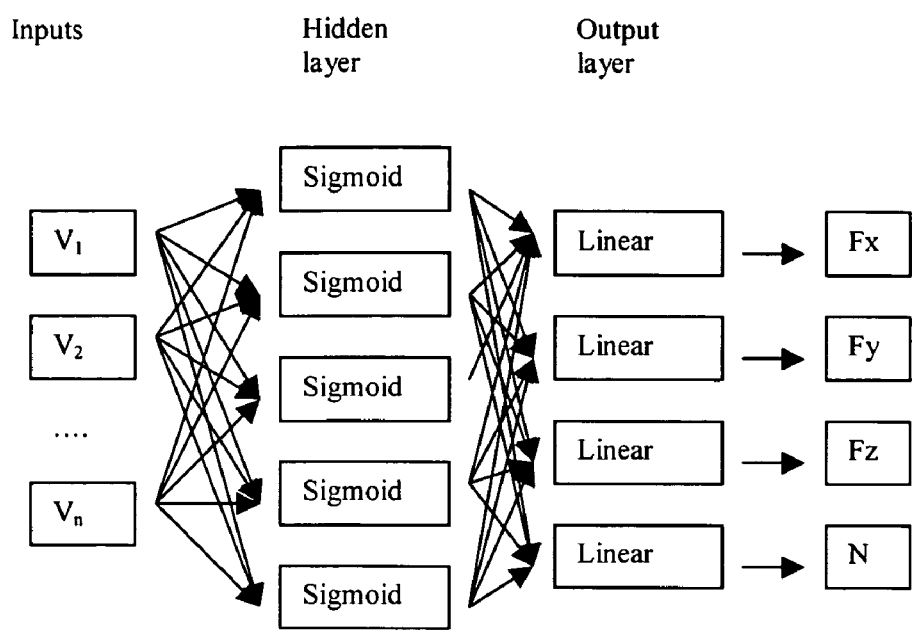
Figure 16:
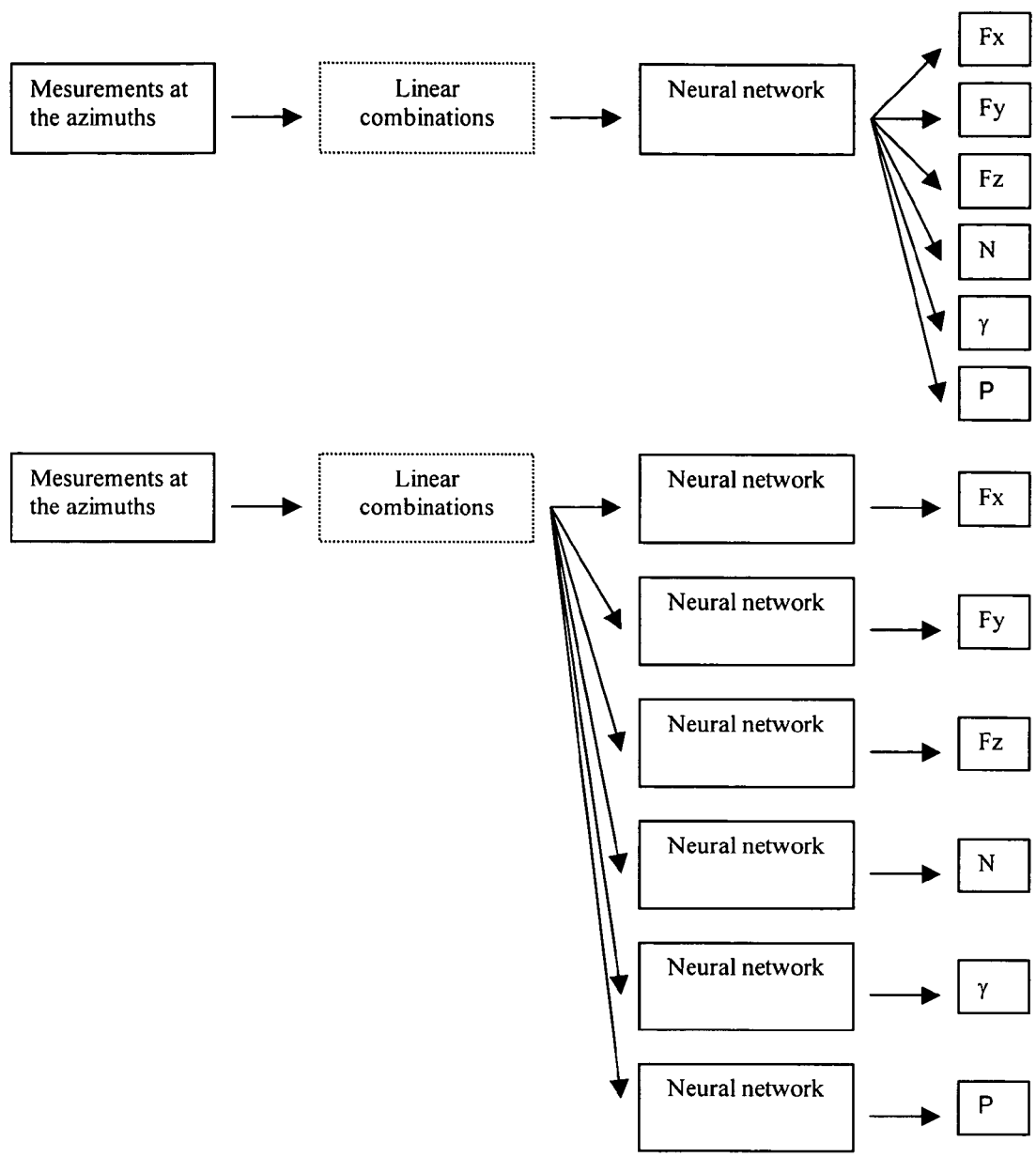
Figure 17A:
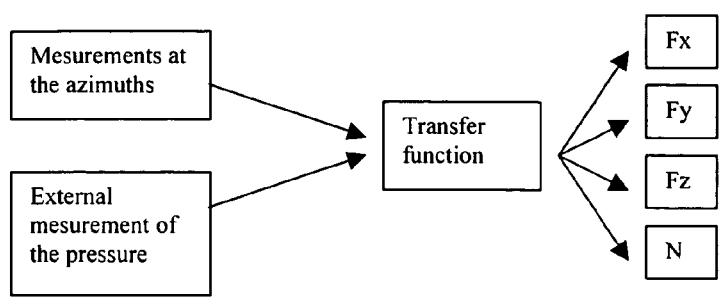
Figure 17B:
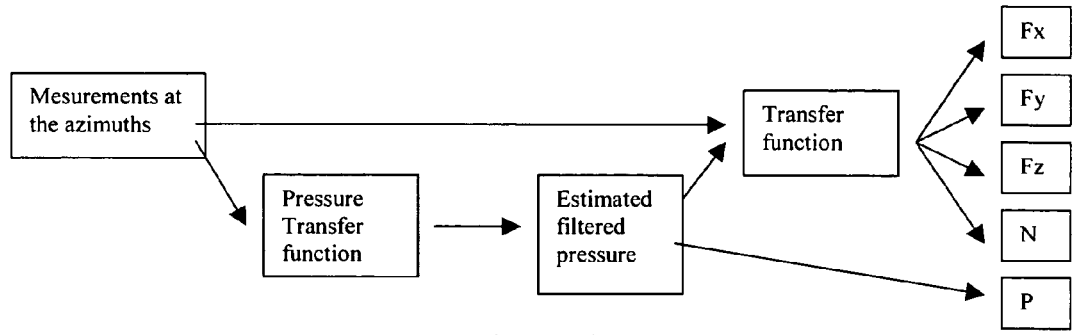
Figure 18:
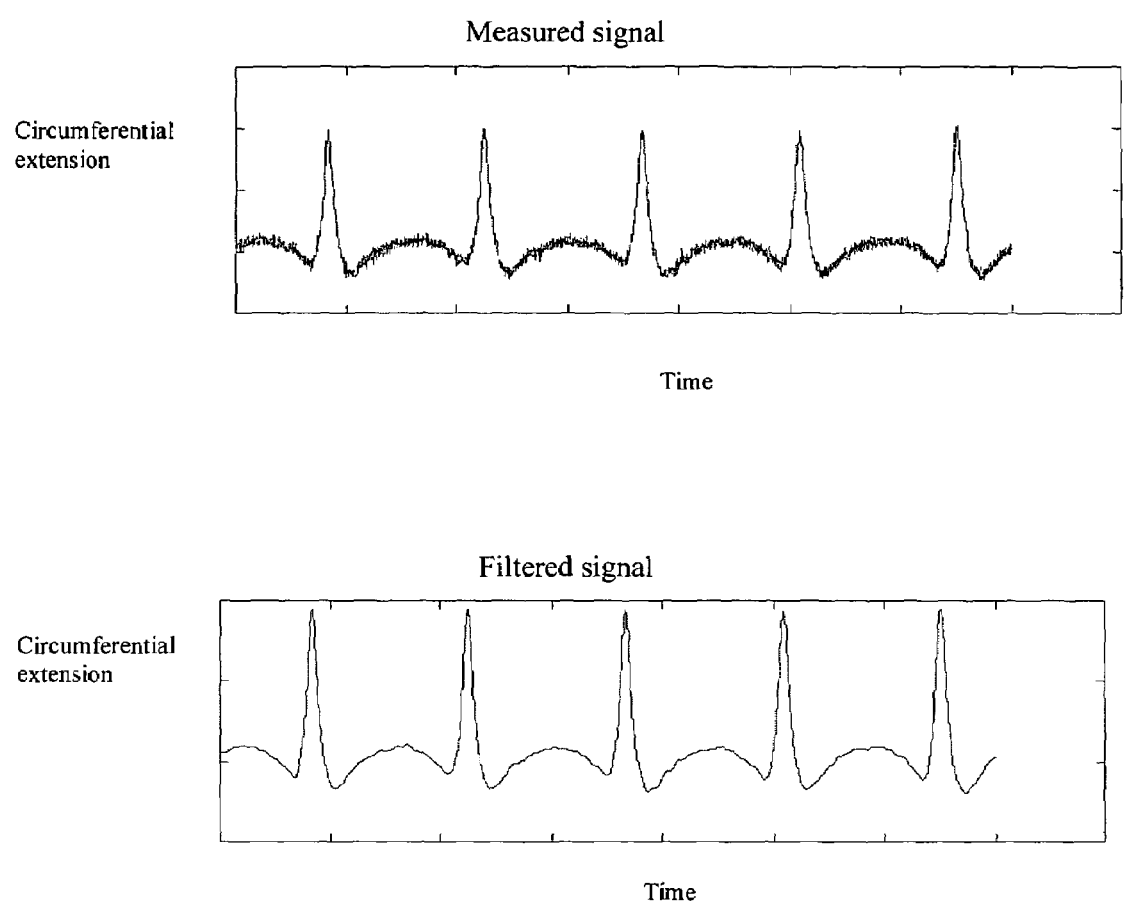
Figure 19:
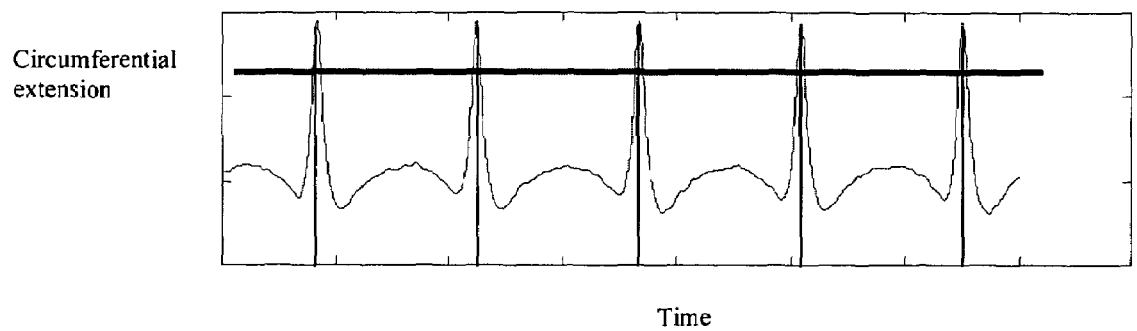
Figure 20:
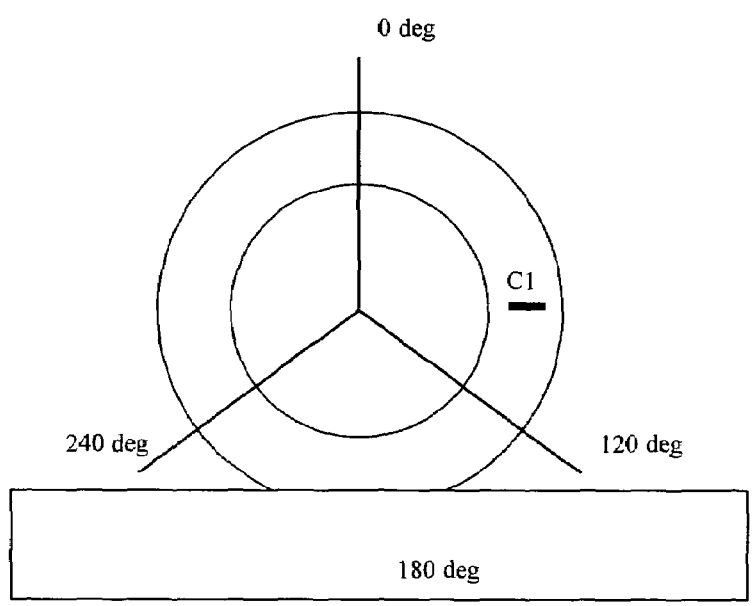
Figure 21:
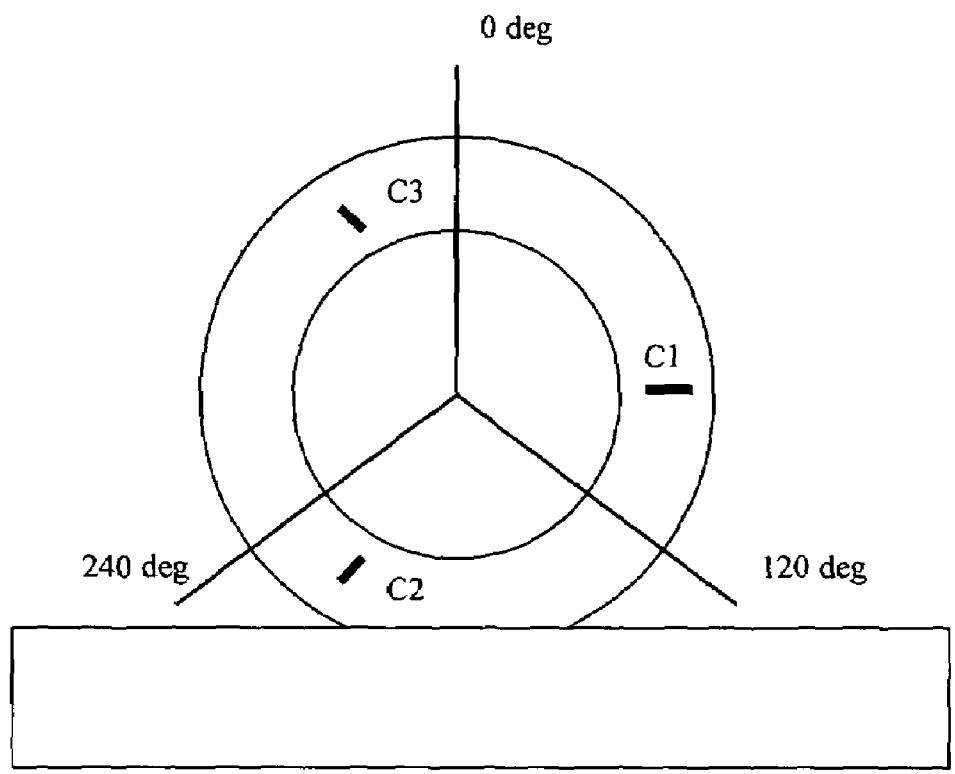
Figure 22:
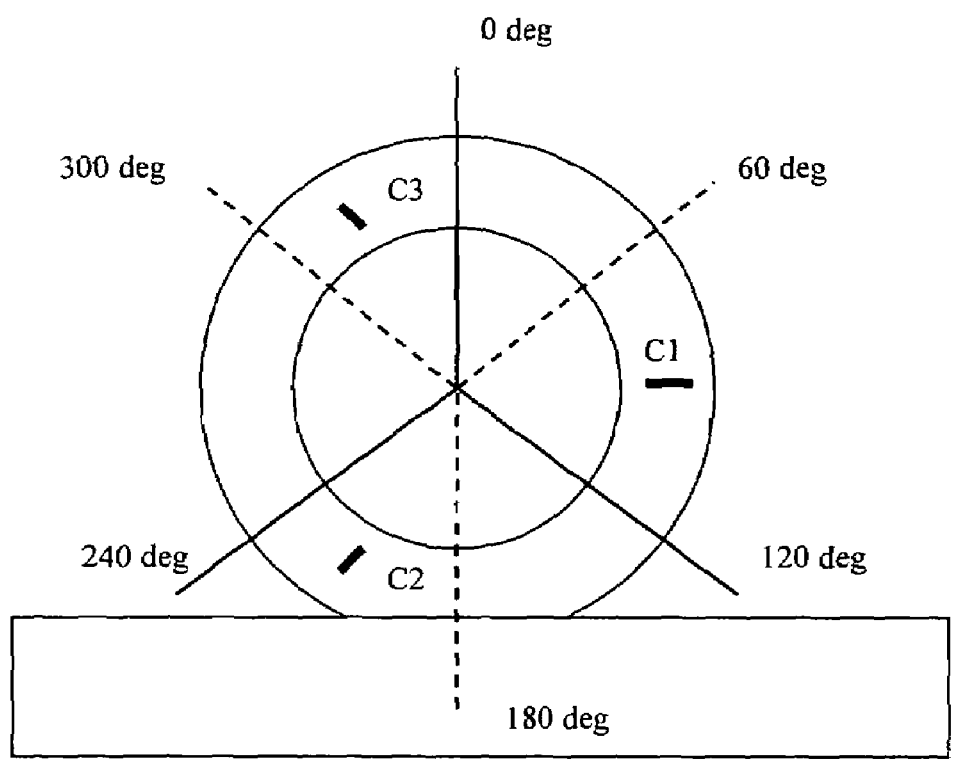

in which the solid curve corresponds to a vertical load of 400 daN, in which the dotted curve corresponds to a vertical load of 500 daN, and in which the dotted and dashed curve corresponds to a vertical load of 300 daN;

FIGS. 11a and 11b show the effect of the component Fx:

in which the solid curve corresponds to a vertical load of 400 daN and no force Fx, in which the dotted curve corresponds to a vertical load of 400 daN and a force of Fx of 400 daN (driving force), in which the dotted and dashed curve corresponds to a vertical load of 400 daN and a force Fx of −400 daN (braking force);

FIGS. 12a and 12b show the effect of the component Fy:

in which the solid curve corresponds to a vertical load of 400 daN with no force Fy, in which the dotted curve corresponds to a vertical load of 400 daN with a force Fy of 280 daN;

FIG. 13 shows the deformation of the tire when a camber angle is applied,

FIGS. 14a and 14b show the effect of the camber on the circumferential deformation signals:

in which the solid curve corresponds to a vertical load of 400 daN with no forces Fx and Fy, and to a zero camber angle, in which the dotted curve corresponds to a vertical load of 400 daN with a camber angle of 2°, in which the dotted and dashed curve corresponds to a vertical load of 400 daN with a camber angle of 4°;

FIG. 15 shows the architecture of a neural network;

FIG. 16 shows examples of transfer functions in which the linear combinations at the input are optional. It is possible to use one network with a plurality of outputs, or a plurality of networks with one output, or any other combination;

FIGS. 17a and 17b show two examples of an architecture allowing the inflation pressure of the tire to be taken into account if it varies;

FIG. 18 shows the raw time signal and the filtered time signal;

FIG. 19 shows the identification of passage through the contact area on the basis of the time signal;

FIG. 20 shows a functional example with one sensor and one model;

FIG. 21 shows a functional example with three sensors and one model;

FIG. 22 shows a functional example with three sensors and two models:

in which the positions indicated by solid lines represent the azimuths at which the measurements have to be taken in order to be used as an input for model 1;

in which the positions indicated by dotted lines represent the azimuths at which the measurements have to be taken in order to be used as an input for model 2;

in which C1, C2 and C3 represent the positions of the sensors on the sidewall of a tire.

Figure 23:
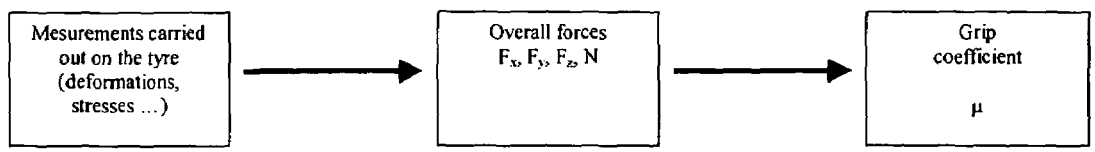
Figure 24:
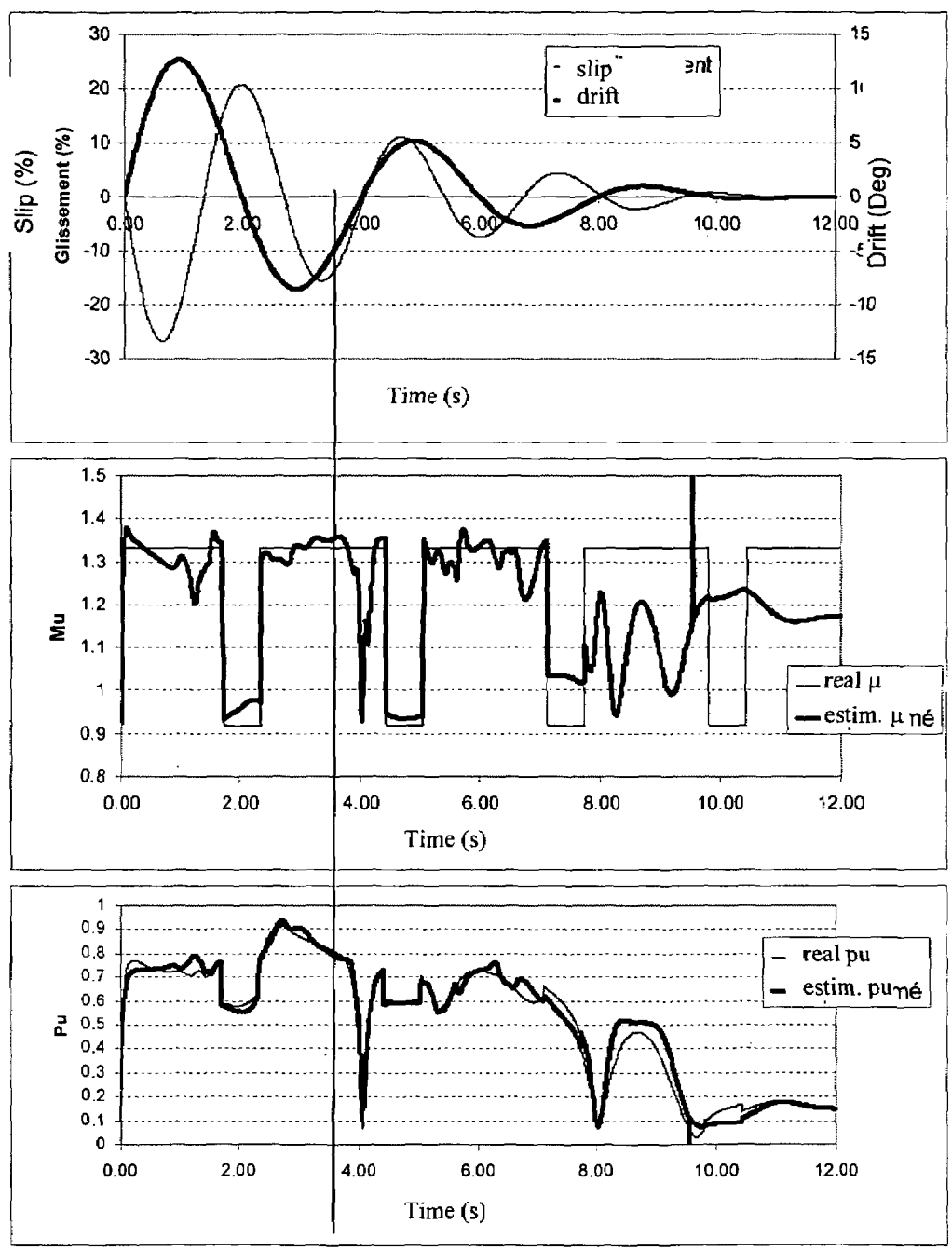

FIG. 23 is a block diagram of the estimation of the forces, then μ, on the basis of the deformation measurements;

FIG. 24 gives the results of the estimation of μ and of the percentage of the grip potential used "pu".

DETAILED DESCRIPTION

Figure 1:
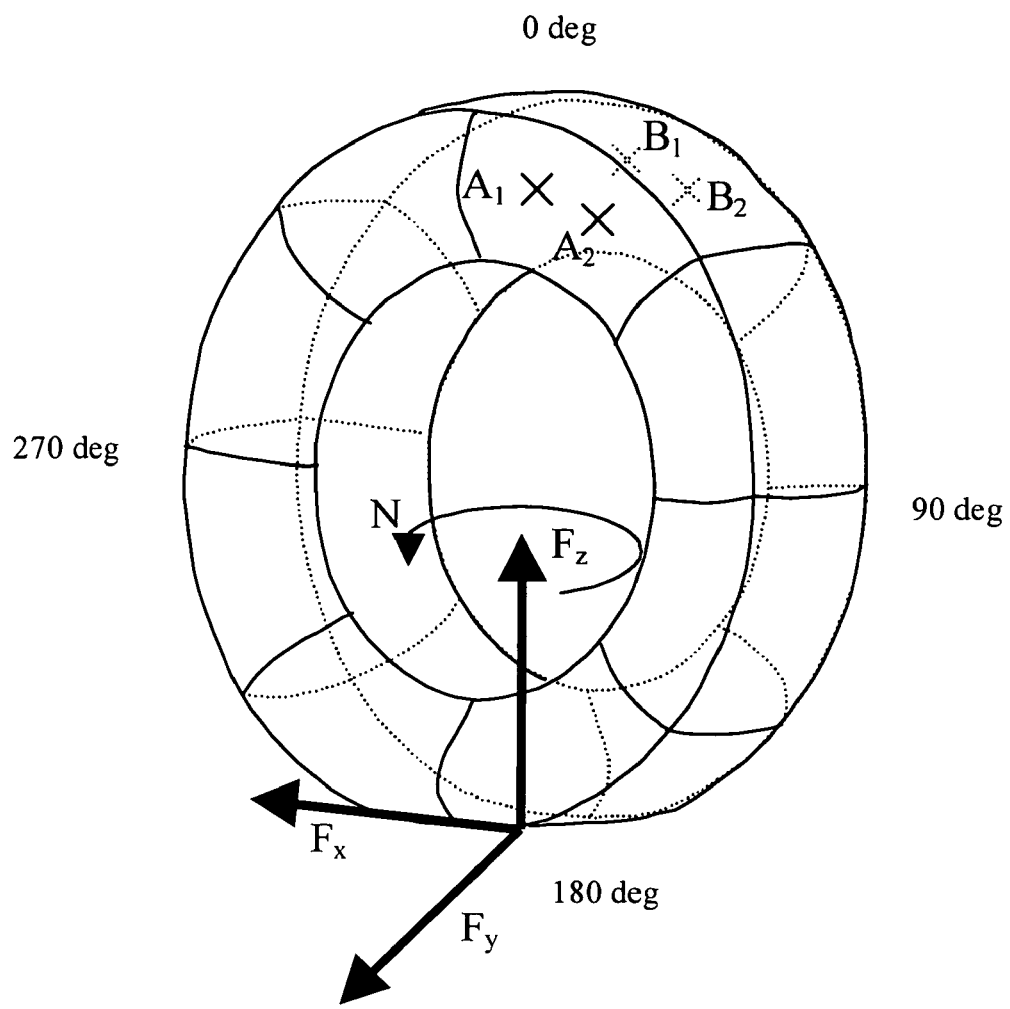
FIG. 1 is a perspective of a tire on which the conventions useful for understanding the invention are defined.

The method described here relies on the fact that each force applied to the tire in the contact area causes a modification of the circumferential extension of the sidewalls of the tire. The case of an inflated tire fitted on its wheel will be considered, on whose first sidewall two points $A_1$ and $A_2$ are identified (FIG. 1), which are placed at the same radius but are separated in the circumferential direction. On the second sidewall, at the same azimuths as $A_1$ and $A_2$ and at the same radius, two points $B_1$ and $B_2$ are selected. In the absence of any forces being applied to the tire, the distance which separates the two points is constant as a function of the angle of rotation of the tire-wheel assembly. The azimuth θ will be defined as the angle at which the circumferential extension of the sidewalls is being analyzed. The origin of the azimuth is taken on the side opposite to the center of the contact area. The center of the contact area therefore has the azimuth 180°.

Figure 10A:
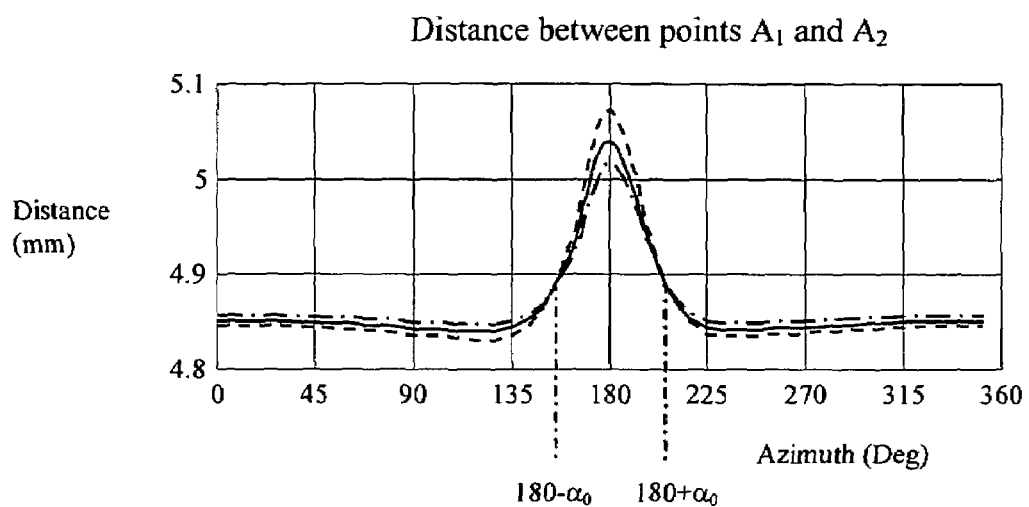
FIGS. 10a and 10b show the effect of the vertical component Fz.
Figure 10B:
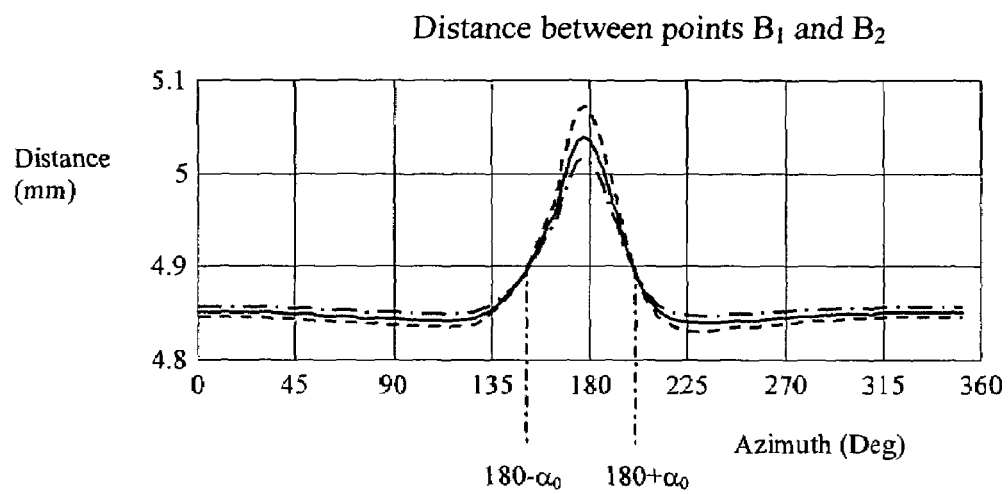

When the tire is subjected to forces, the following effects are observed for each of the components of the said forces:

The vertical component (denoted by Fz) presses the tire onto the ground. By creating a contact area, it leads to a variation of the distance between the two points $A_1$ and $A_2$ when the tire is in rotation, reflecting a modification of the circumferential extension of the sidewalls. FIGS. 10a and 10b indicate the distance which separates points A and points B, respectively, as a function of the azimuth where they lie. Increasing the applied vertical component leads to an extension of both sidewalls in the contact area (increase in distance near 180°) and a contraction of the other zones of the sidewall, principally at the entry and exit of the contact area (decrease in the distance everywhere else, principally near 135° and 225°). It is also worth pointing out that there is one azimuth at the entry of the contact area, and one azimuth at the exit of the contact area, where the value of circumferential extension is substantially independent of the applied component Fz. Let $α_0$ be such that these particular azimuths are equal to $(180−α_0)°$ and $(180+α_0)°$.

The horizontal component in the rolling direction (denoted by Fx) causes differentiation between the zones situated at the entry and exit of the contact area. This entails a change in the extension of the sidewalls, essentially at the entry and exit of the contact area. FIGS. 11a and 11b illustrate the effects of the component Fx of the applied forces by indicating the distance which separates points A and points B, respectively, as a function of the azimuth where they lie. When a positive force Fx is applied (driving torque), both sidewalls are compressed in the circumferential direction at the entry of the contact area and are in extension at the exit of the contact area (Decrease in the distance near about 135° and increase near about 225°). When a negative force Fx is applied (braking torque), both sidewalls are compressed in the circumferential direction at the exit of the contact area and are in extension at the entry (Decrease in the distance near 225° and increase near 135°).

The horizontal component in the transverse direction (denoted by Fy) principally causes differentiation between the two sidewalls. FIGS. 12a and 12b illustrate the effects of this type of constraint by indicating the distance which separates points A and points B, respectively, as a function of the azimuth where they lie. In the case of a constraint with positive Fy, one of the sidewalls is principally put into circumferential extension (increase in the distance between $A_1$ and $A_2$), and the other sidewall is put into circumferential contraction (decrease in the distance between $B_1$ and $B_2$).

The self-alignment torque N (moment about the vertical axis) is not, strictly speaking, another force acting between the tread of the tire and the road. Rather, it is a consequence of the way in which the components Fx, Fy and Fz are applied in the contact area. If the point of application of the resultant whose components are Fx, Fy and Fz is not the center of the contact area, this resultant generates a moment about Oz which is referred to as the self-alignment torque. The existence of this moment principally entails a rotation of the contact area about Oz. The consequence of this effect is, for example, a circumferential extension at the entry of the contact area and a circumferential contraction at the exit of the contact area on one sidewall, whereas on the other sidewall, a circumferential contraction is observed at the entry of the contact area and a circumferential extension is observed at the exit of the contact area, with respect to a situation with zero self-alignment torque.

In the event that a significant camber angle is applied to the tire, the behavior of the two sidewalls is different. Simplistically, everything happens as if one sidewall were carrying more load than the other. FIG. 13 illustrates this behavior by comparing a cross section of the part of the tire in the contact area without any camber and with a camber γ. This also results in a slight lateral movement of the contact area, which entails a thrust in the Y direction. FIGS. 14a and 14b show the change of the circumferential deformation in the two sidewalls. On the overloaded sidewall (points A), the change is similar to that of an increase in the load. On the other sidewall (points B), a change is seen which is compatible with a decrease in the load being supported.

Before continuing, it should be pointed out that the extension signal as a function of the azimuth, s(θ), can then be divided into two signals $s_p(θ)$ and $s_i(θ)$, which are such that:

$$μs(θ)=s_p(θ)+s_i(θ)$$

$$μs_i(θ)=−s_i(−θ)$$

$$μs_p(θ)=s_p(−θ),$$

in which $s_i$ is referred to as the odd part of the signal s, and $s_p$ is referred to as the even part of the signal s.

Likewise, let $s^1(θ)$ and $s^2(θ)$ be the signals associated with the measurement of the circumferential extension on each of the sidewalls of the tire, and let $S_p^1$, $S_i^1$, $S_p^2$, $S_i^2$ be their resolutions into an azimuth-related even part and an azimuth-related odd part. The following are defined:

$$\mu\ s_p^p(\theta) = \frac{s_p^1(\theta) + s_p^2(\theta)}{2}$$

$$\mu\ s_p^i(\theta) = \frac{s_p^1(\theta) + s_p^2(\theta)}{2}$$

$$\mu\ s_i^p(\theta) = \frac{s_i^1(\theta) + s_i^2(\theta)}{2}$$

$$\mu\ s_i^i(\theta) = \frac{s_i^1(\theta) + s_i^2(\theta)}{2}$$

$s_p^p$ is referred to as the sidewall-related even and azimuth-related even part.
$s_p^i$ is referred to as the sidewall-related odd and azimuth-related even part.
$s_i^p$ is referred to as the sidewall-related even and azimuth-related odd part.
$s_i^i$ is referred to as the sidewall-related odd and azimuth-related odd part.

Owing to their orientations, the forces Fx, Fy, Fz and the self-alignment torque N are linked with certain symmetries. In particular, this principle can be used to decouple the effects of the force components on the tire.

By virtue of these observations, the method explained here proposes to carry out measurements of the circumferential extension on at least one sidewall of the tire. With the aid of mathematical operations (linear or non-linear combinations of the measurements carried out at the various azimuths), these measurements make it possible to estimate the values of the signals $s_i^p$ $s_p^i$ $s_p^p$ and $s_i^i$ at certain azimuths, and thereby to provide an evaluation of the grip coefficient.

FIGS. 14a and 14b will again be considered. Given that the change is odd in relation to the sidewalls and even in relation to the azimuths, it is readily possible to distinguish an effect of the camber from an effect of Fx, Fz and N. FIGS. 12 and 14 show that the consequences of Fy and of the camber are not identical; it is therefore possible to establish an unambiguous relationship between the circumferential deformation signals and the camber. With the aid of the measurements of circumferential deformation, it is then possible to estimate the camber angle at which the tire is working.

The apparent rigidity of a tire originates both from its pneumatic behavior (from its inflation pressure) and from its structural rigidity (rigidity of its architecture). The measured circumferential deformation signals themselves also contain a pneumatic component and a structural component. For example, the deformation signals of a tire inflated to 2 bar and loaded with 400 daN along Z are not identical to those delivered by the same tire at 2.5 bar and loaded with 500 daN. This difference corresponds to the structural contribution, and can make it possible to estimate the inflation pressure of the tire.

In the event that the inflation pressure varies, the relationships which link the applied forces and the deformation signals are quantitatively modified, but without their nature being changed. The extension factors in the sidewalls are influenced by the pressure and by the load; they are made up of one contribution due to the "pneumatic" behavior (that is to say dependent on the inflation pressure) and another contribution due to the structural behavior (that is to say of the constituent materials of the tire and their arrangement), which does not change when the pressure is changed, so that information about the pressure can be obtained.

The method may thus be explained firstly in the case of an inflation pressure which is assumed to be constant, for the sake of simplicity. Likewise, it will be considered below that the camber is constant and zero, in order to make the explanation clearer, and only the most interesting cases concerning this parameter will be mentioned.

When a constraint which mixes components Fx, Fy and Fz is applied, a superposition of the aforementioned effects on the extension in the circumferential direction is observed. One of the advantages of the proposed method is that it makes it possible to separate the contributions of each component of the applied constraint, so as to make it possible to estimate each of these components.

Figure 4:
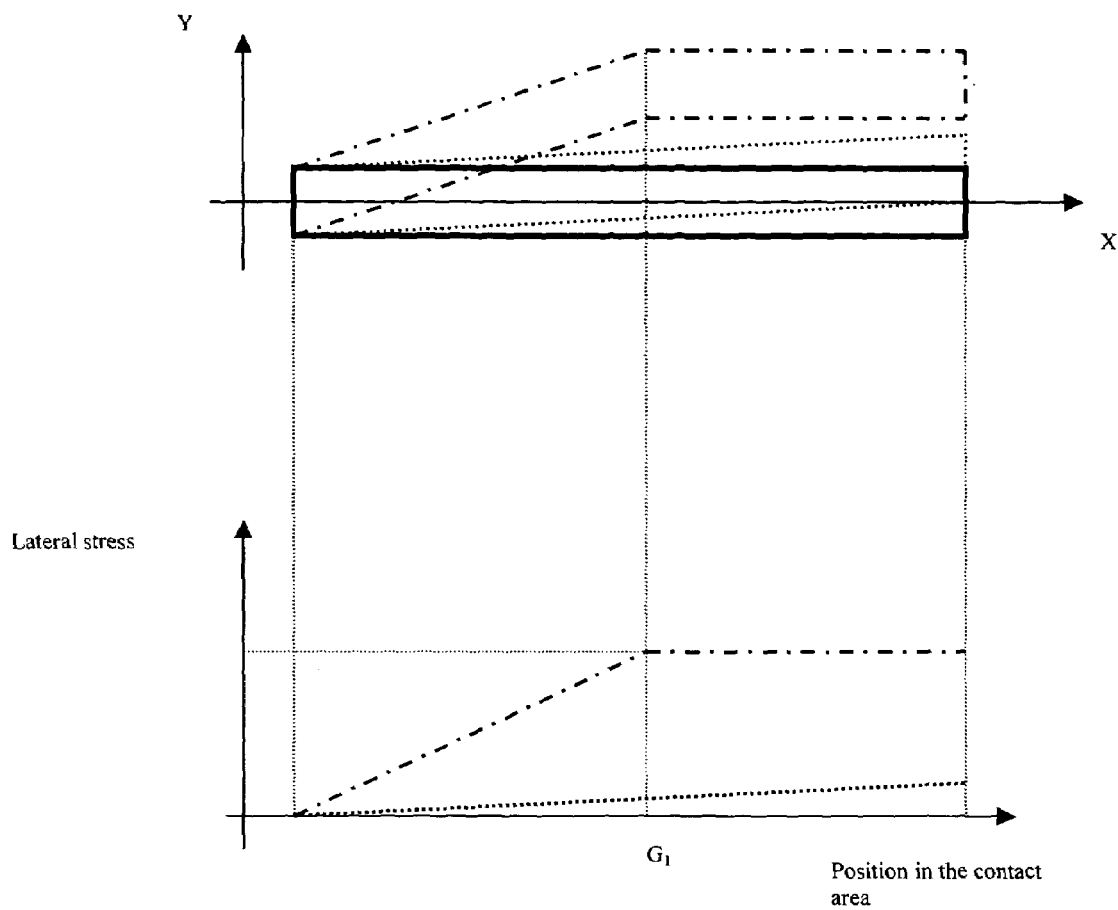
FIG. 4 illustrates the shearing of a rib in the contact area, as well as the associated stresses.

The estimation of the grip proposed by the invention is based on the following observation: a simplified tire provided with a single continuous rib will be considered. FIGS. 2 and 3 represent such a tire. In the zone of the contact area, the rib is subjected to a vertical stress which presses it against the ground. This is often referred to as flattening, in the footprint of the tire on the ground. If there is no drift of the tire, a straight line is formed by reference points which are taken on the rib so that they are aligned in the contact footprint with the ground then lie, when the tire rotates, in a plane which contains the said straight line defined when the points were in the contact footprint. If a drift angle is applied to the tire when it is rolling, the plane containing the said reference points when they are sufficiently far away from the contact footprint on the ground forms an angle equal to the drift angle with the reference points when they are aligned in the contact footprint with the ground. The solid line in FIG. 4 shows the rib seen from above with no drift, and the dotted line shows the rib with an imposed drift. The more the contact area is pressed in, the more the rib is sheared and the greater is the lateral stress which is applied. If the drift angle is sufficient, there is a point $G_1$ in the contact area where this lateral stress becomes greater than the maximum grip potential $\mu_1$, and the rib starts to slip. This situation is represented by dots and dashes in FIG. 4.

The lateral force $Fy_1$ generated by the tire is equal to the integral of the lateral stress in the contact area.

Figure 5:
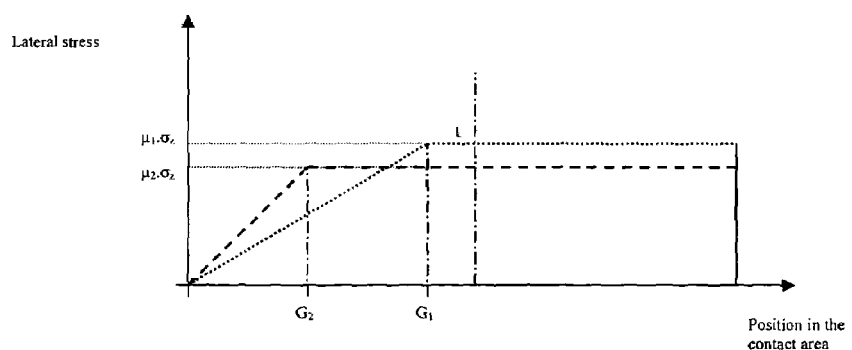
FIG. 5 illustrates the effect of the coefficient of friction on the distribution of the forces.

If the tire is placed at a position where the maximum grip potential $\mu_2$ is less than $\mu_1$, it is necessary to increase the drift angle so that the tire generates the same thrust force Fy. The slip zone then starts at the point $G_2$ closer to the entry of the contact area. FIG. 5 allows the two situations to be compared.

Between these two configurations, the lateral forces are the same (same area under the curve) but the point of application of the force Fy has moved. The more the maximum grip potential decreases, that is to say the more the grip coefficient decreases, the more the point of application of the lateral force moves towards the entry of the contact area.

One consequence is that, for the same lateral force Fy, the self-alignment torques differ because of a movement of the point of application of the force. In theory, measurement of the overall forces (here Fy and N) may be used to estimate the maximum grip potential. This is because, for a given force Fy, there is a monotonic relationship between the self-alignment torque N and the maximum grip potential $\mu$. Thus, in this example, simultaneous measurement of Fy and N hence makes it possible to measure the maximum grip potential $\mu$ if there is a slip zone in the contact area.

Since measurement of the circumferential extension makes it possible to estimate the overall forces (Fx, Fy, Fz, N), it makes it possible to estimate the maximum level of grip by additional processing and by using the principle expounded above.

On a real tire, the behavior is more complex and other phenomena are added to those adopted in this example, but the same principle for measuring the maximum grip potential applies.

Not only Fy will be considered this time, but also Fx and Fz which can vary and, in the same way as μ, affect the geometry of the zone which is slipping and therefore N. There is therefore a function f such that:

$$\mu N = f(F_x, F_y, F_z, \mu, \ldots)$$

Figure 6:
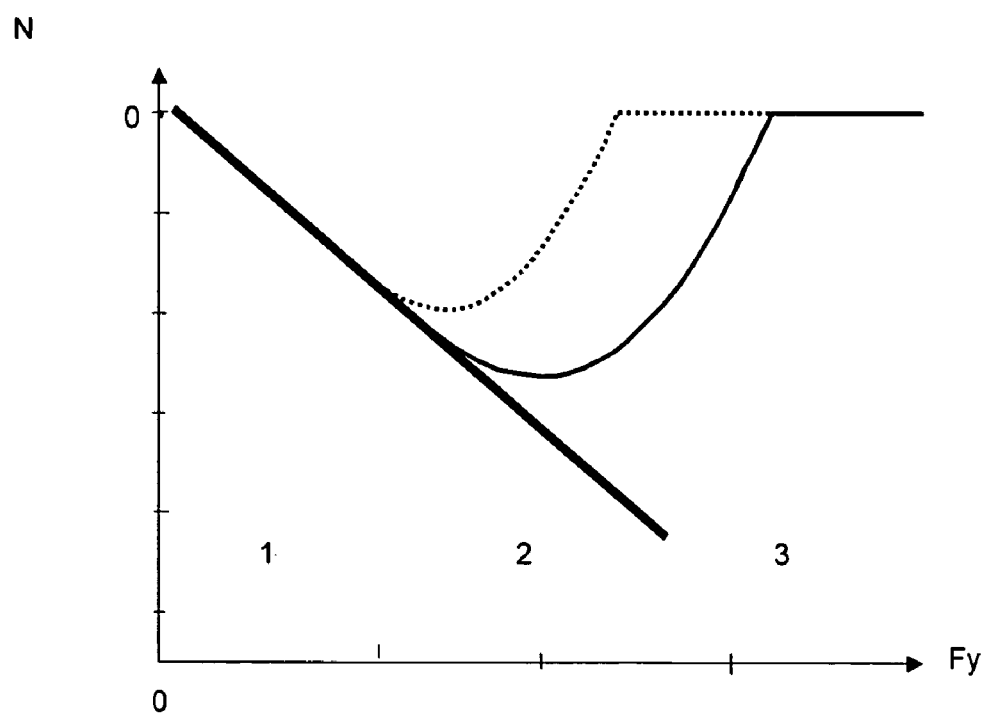
FIG. 6 illustrates the relationship between N and Fy on a real tire as a function of the coefficient of friction.

FIG. 6 represents the function f as a function of Fy for several levels of μ, Fx constant (0 daN) and Fz constant (400 daN). The three zones of behavior can be seen (Absence of slipping: zone 1, partial slipping: zone 2, total slipping: zone 3).

Figure 7:
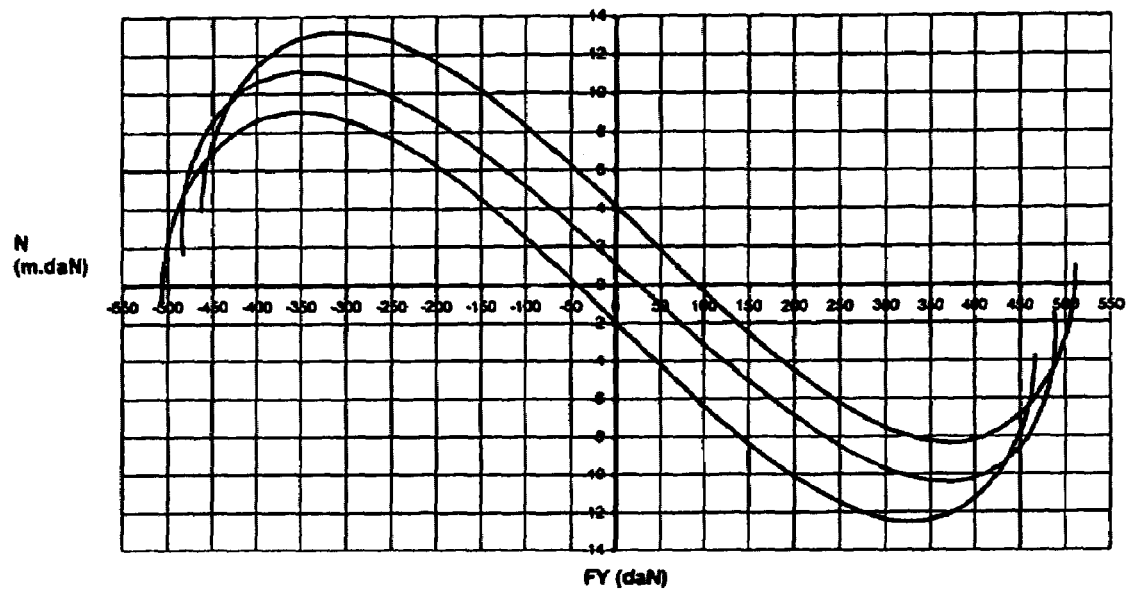
FIG. 7 represents the relationship between N and Fy with zero Fx and constant Fz when the camber angle varies.

In common operation, other parameters of the tire change constantly and modify the relationship which exists between the forces. In particular, the camber angle applied to the tire and the inflation pressure are liable to vary. It is then necessary to consider $N = f(F_x, F_y, F_z, \mu, P, \gamma)$ For a given tire, rolling under fixed grip conditions, the effect of the variation in the camber angle is to modify the relationship $N = f(F_x, F_y, F_z, \mu)$, essentially entailing a translation of the surface in the space $(F_x, F_y, F_z)$. FIG. 7 represents the relationship between N and Fy with zero Fx and constant Fz for various values of the camber angle. If the camber angle is known (by measurement or estimation), it is possible to take into account this perturbation by applying a translation, in order to return to the zero camber situation, before applying the function g which gives an estimate of μ.

Figure 8:
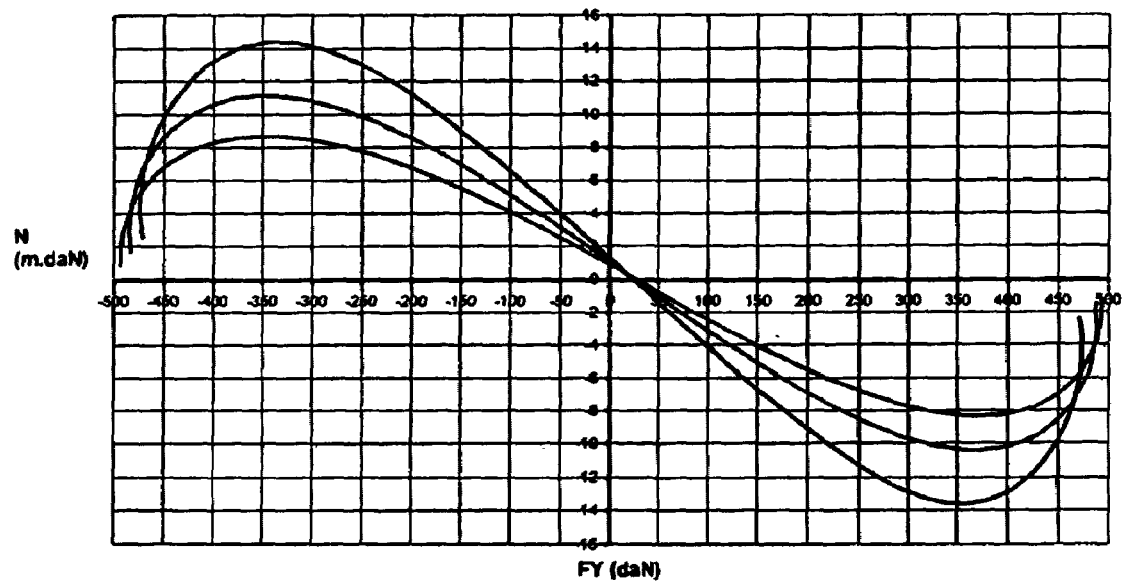
FIG. 8 represents the relationship between N and Fy with zero Fx and constant Fz when the camber angle varies.

The inflation pressure, of course, also has a direct influence on the relationship $N = f(F_x, F_y, F_z, \mu)$. FIG. 8 presents the effect of the pressure variation on $N = f(F_x, F_y, F_z, \mu)$ for the condition Fx=0, Fz=const. The principal observed effect entails a rotation of the center O (Fy=0, N=0). However, a simple a priori correction such as that proposed for the camber (it would be a rotation in this case) does not seem precise enough.

One response consists in seeking an inverse function $\mu = g(F_x, F_y, F_z, N, P)$ taking the pressure explicitly into account as a parameter.

The wear of the tire is also a factor influencing the relationship which exists between the forces and the level of grip. The perturbation which is generated is difficult to model, but remains fairly small. One approach then consists in using an average inverse function g established on the basis of the characteristics of a new tire and a worn tire.

In the case corresponding to zones 2 and 3 in FIG. 6, there is a function g such that:

$$\mu = g(F_x, F_y, F_z, N, P, \gamma, \ldots)$$

It may, for example, be determined by using a neural-network approach. Any other mathematical method making it possible to invert a function or approximate its inverse may, however, be used.

The application of a neural-network approach to the evaluation above shows that there is a range I of forces Fx, Fy, Fz in which such a function g exists. This range is physically characterized in the following way:

There is a slip zone in the contact area, which allows μ to have an effect on N.

For every point of this range, N varies monotonically with μ when the forces Fx, Fy and Fz are fixed.

Figure 9:
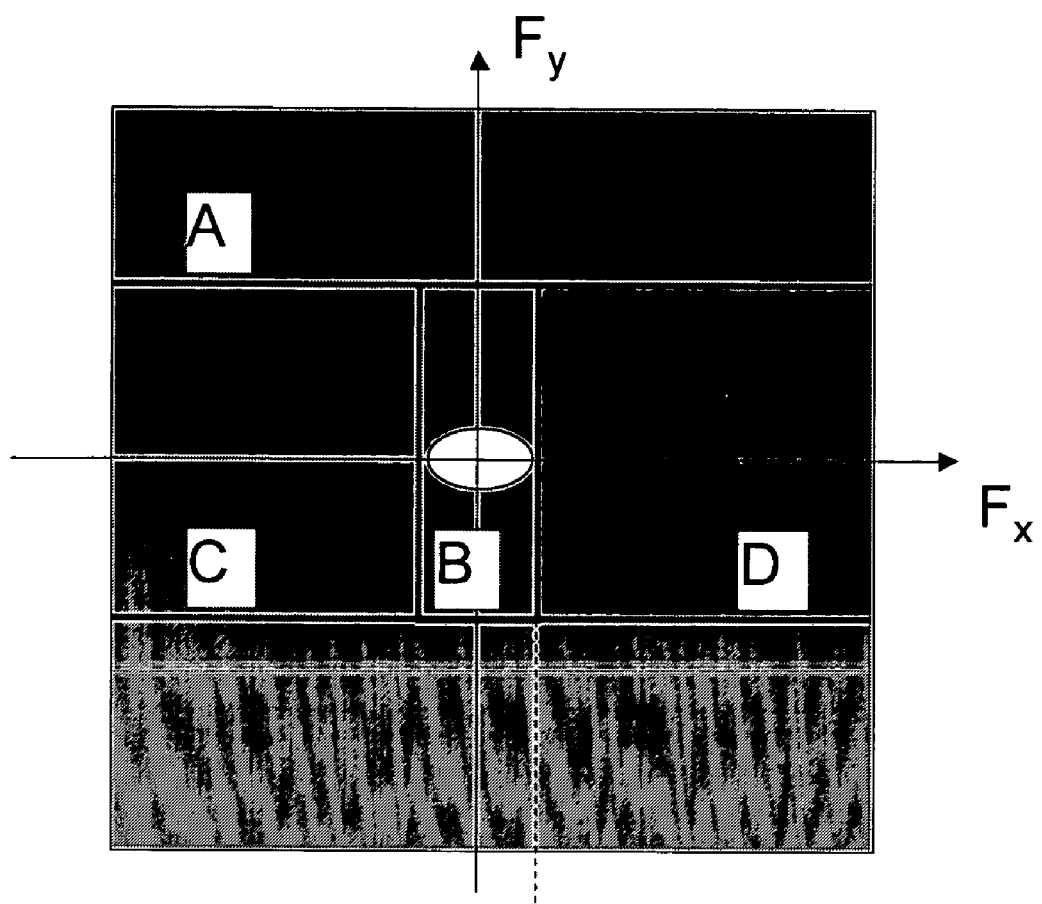
FIG. 9 gives the range of use of the method.

FIG. 9 represents an estimation of the range I in which it is possible to obtain a direct estimate of the maximum grip potential. This range consists of the union of the zones marked A, B and C, excluding the zone where there is no partial slipping (elliptical zone around $F_x=0$ and $F_y=0$).

The part referred to as A corresponds to situations in which the lateral force is very great. This zone corresponds, for example, to very sharp bends.

The part referred to as B corresponds to the one most commonly encountered during normal use of the vehicle. These are situations of moderate braking and acceleration, possibly combined with a bend.

Lastly, zone C corresponds to very hard braking.

In this range I, it is possible to define a neural network of the perceptron type which approximates the inverse function g. Specifically, the weightings of the neural network may be determined in the following way:

Compiling a data base containing Fx, Fy, Fz, and N for a set of constraints of the tire on ground surfaces having different grip coefficients. Combinations of the parameters (Fx, Fy, Fz and μ) are imposed on the tire. They are recorded at the same time as the value of the self-alignment torque N which is measured. This operation may be carried out either on a machine provided with various ground surfaces and with a measurement of the forces and N, or on a vehicle equipped a dynamometric wheel which measures Fx, Fy, Fz and N while driving over different ground surfaces. In the event that it is necessary for the system to operate with variable camber and pressure conditions, the database should also contain a sufficient number of constraint cases representative of the range to be covered.

By training, determining the weightings of a neural network making it possible to reconstruct μ on the basis of knowledge of Fx, Fy, Fz and N, and possibly the inflation pressure P and the camber γ. In the event that the correction by translation of the curves is sufficient to accommodate the effect of the camber, the approach will consist in determining the translation to be applied as a function of the camber angle, in order to return all the conditions to the case of zero camber. It will then be possible to determine the weightings of a neural network by training.

Testing and using the transfer function determined in this way throughout the range covered by the training.

It should be pointed out here that one interesting way of reducing the number of input parameters, at the cost of a decrease in precision, consists in using not the forces Fx, Fy and Fz and N but the reduced values $$\frac{Fx}{Fz}, \frac{Fy}{Fz}, \frac{N}{Fz}.$$

By adopting a procedure similar to the one described in detail above, a function h such that $$\mu = h\left(\frac{Fx}{Fz}, \frac{Fy}{Fz}, \frac{N}{Fz}, \ldots\right)$$

is then obtained.

In practice, the coefficients of the model are preferably determined according to a precise approach in order to obtain a high-quality model on the basis of a number of measurements which is as small as possible. This approach may be divided into a plurality of successive steps:

Adding data in order to cover the space properly. Depending on the test means which is used for constraining the tire, it may be difficult to scan properly through the space of Fx, Fy and Fz values. In this first step, a model of N is used which is fitted to the experimental data and whose mathematical form allows the physical variations of N to be represented as a function of the forces, in order to add additional points in the zones where there are few measurements.

Selecting the relevant data. The measurement points which are obtained are not always well distributed in the space Fx, Fy, Fz. Certain regions of the space contain many measurements, whereas there are fewer measurement points in other regions. Directly using these data would lead to the highly populated regions being given more weight compared with the other regions when seeking the coefficients of the inverse model. One procedure consists in dividing the space into cells of constant size and keeping only a maximum number of points per cell. Rather than retaining measurement points at random, it is moreover possible to eliminate the most highly dispersed measurements.

Seeking a direct model N=f(Fx, Fy, Fz, μ, ... ) by adding data for intermediate levels of grip. Indeed, it is experimentally difficult to provide varied and well-controlled grip conditions. In order to find the model giving μ, it is quite often expedient to use only two or three different levels of grip, which is sometimes insufficient. This difficulty can be overcome by seeking a direct model parameterized by μ with the aid of the available levels of grip, and by using it to add points at intermediate grips. It is also possible to construct one direct model per measured value of μ, and to interpolate between these levels.

Seeking the inverse model μ=g(Fx, Fy, Fz, N, ... ) on the basis of concatenating the measured data and the added data. This phase involves adjusting the final model, which may be in the form of a neural network, with the aid of the sorted experimental data and some added data, which make it possible to condition the form of the model in certain regions.

Obtaining an estimate of the maximum grip coefficient on the basis of the functions defined above necessarily assumes knowledge of Fx, Fy, Fz and N, as well as the pressure and the camber in the event that these are being taken into account. For example, and preferably, they may be determined in the following way on the basis of circumferential extension measurements, while partly relying on significant parity characteristics, which correspond to the natural symmetries of the tire, in order to carry out this separation.

The azimuth θ has been defined as the angle at which the circumferential extension of the sidewalls is being analyzed. The origin of the azimuth was fixed on the side opposite to the center of the contact area. The center of the contact area therefore has the azimuth 180°. It has been seen that the extension signal as a function of the azimuth, s(θ), can be divided into two signals $s_p(\theta)$ and $s_i(\theta)$, which are such that:

$$\mu s(\theta)=s_p(\theta)+s_i(\theta)$$

$$\mu s_i(\theta)=-s_i(-\theta)$$

$$\mu s_p(\theta)=s_p(-\theta)$$

$s_i$ is referred to as the azimuth-related odd part of s, and $s_p$ is referred to as the azimuth-related even part of s.

The following were likewise defined:

$$\mu\ s_p^p(\theta) = \frac{s_p^1(\theta)+s_p^2(\theta)}{2}$$

$$\mu\ s_p^i(\theta) = \frac{s_p^1(\theta)+s_p^2(\theta)}{2}$$

$$\mu\ s_i^p(\theta) = \frac{s_i^1(\theta)+s_i^2(\theta)}{2}$$

$$\mu\ s_i^i(\theta) = \frac{s_i^1(\theta)+s_i^2(\theta)}{2}$$

$s_p^p$ is referred to as the sidewall-related even and azimuth-related even part.

$s_p^i$ is referred to as the sidewall-related odd and azimuth-related even part.

$s_i^p$ is referred to as the sidewall-related even and azimuth-related odd part.

$s_i^i$ is referred to as the sidewall-related odd and azimuth-related odd part.

Thus, according to the observations (FIGS. 8a, 8b, 9a, 9b, 10a and 10b) the signal:

$s_i^p$ is mainly linked with the force Fx.

$s_p^i$ is mainly linked with the force Fy $s_p^p$ is mainly linked with the force Fz The symmetries which apply furthermore make it possible to assert that the signal $s_i^i$ is principally linked with the self-alignment torque N.

By virtue of these observations, the method explained here proposes to carry out measurements of the circumferential extension on at least one sidewall of the tire. With the aid of mathematical operations (linear or non-linear combinations of the measurements carried out at the various azimuths), these measurements make it possible to estimate the values of the signals $s_i^p$ $s_p^i$ $s_p^p$ and $s_i^i$ at certain azimuths, and thereby to provide an evaluation components of the applied force.

With the view of clarifying the procedure, some examples of use of the method, which are not exhaustive, are presented here. The case in which the measurements are carried out on only one sidewall will be considered.

Determination 1:

The intention is to estimate the components of the forces which are applied in the contact area, and the self-alignment torque, on the basis of measurements of the circumferential extension of one sidewall of the tire, measured at three azimuths. The measurement azimuths are selected in the following way:

One of the azimuths corresponds to the middle of the contact area (azimuth 180°). Let $V_c$ be the value measured at this point. The azimuth which corresponds to the side opposite to the contact area can be used equivalently.

The other two azimuths are symmetrical with respect to the azimuth of the center of the contact area. (180°+α° and 180°−α°). Let $V_1$ and $V_2$ be the values measured at these points.

According to the observations above:

$V_2-V_1$ makes it possible to estimate the imbalance between the entry of the contact area and the exit. This value will be principally linked with the component Fx. An estimate of Fx is given by $f_x(V_2-rV_1)$, where r is a positive real coefficient and $f_x$ is a continuous function. The coefficient r allows any possible asymmetry in the operation of the sensor to be taken into account. It is determined, for example, so as to optimize the correlation coefficient between Fx and $f_x(V_2-rV_1)$.

$V_c-(V_1+V_2)$ makes it possible to estimate the difference between passage through the contact area and outside the contact area. The result here is principally linked with Fz. An estimate of Fz is given by $f_z(V_c-(s_1V_1+s_2V_2))$, where $s_1$, $s_2$ are positive real coefficients and $f_z$ is a continuous function. The coefficients $s_1$ and $s_2$ are determined, for example, so as to optimize the correlation coefficient between Fz between $V_c-(s_1V_1+s_2V_2)$.

$V_c+V_1+V_2$ gives an indication of the overall extension of the sidewall. This value will be principally linked with the component Fy of the applied force. An estimate of Fy is given by $f_y(V_c+u_1V_1+u_2V_2)$, where $u_1$ and $u_2$ are positive real coefficients and $f_y$ is a continuous function. The coefficients $u_1$ and $u_2$ are determined, for example, so as to optimize the correlation coefficient between Fy and $V_c+u_1V_1+u_2V_2$.

In this determination, three components (Fx, Fy, Fz) are estimated on the basis of three measurements of circumferential extension. This simple first configuration may not turn out to be sufficient for allowing estimation of the maximum grip.

Determination 2:

The intention is to estimate the components of the forces which are applied in the contact area, and the self-alignment torque, on the basis of measurements of the circumferential extension of one sidewall of the tire, measured at five azimuths. In this particular case, the determination of the three components of a resultant of forces which are exerted by the road on the contact area of a tire, and of the self-alignment torque generated by the tire, is derived from at least five measurements of circumferential distance variation (extension or contraction) carried out in at least one sidewall of the tire, at five fixed points in space, which lie at different azimuths along the circumference, then the said grip coefficient μ is derived from the determination of the three components of a resultant of forces which are exerted by the road on the contact area of a tire and of the self-alignment torque generated by the tire. The measurement azimuths are selected in the following way:

One of the azimuths corresponds to the middle of the contact area (azimuth 180°). Let $V_c$ be the value measured at this point.

Two other azimuths are symmetrical with respect to the azimuth of the center of the contact area. (180°+α° and 180°-α°). Let $V_1$ and $V_2$ be the values measured at these points.

The final two azimuths are symmetrical with respect to the azimuth of the center of the contact area. (180°+β° and 180°-β°). Let $V_3$ and $V_4$ be the values measured at these points.

Combinations which are of the same nature as, but a little more complex than, those explained in Example 1 make it possible to determine the components Fx, Fy, Fz and N in this case, as well as in cases in which the self-alignment torque is dependent not only on the components Fx, Fy and Fz.

Experimental verifications have made it possible to confirm that this measurement configuration furthermore affords the possibility of distinguishing the effects of Fy from the effects of the camber; consequently, in a very particularly advantageous embodiment, the method is also valid under conditions of camber significantly different from zero, and it is possible to evaluate the camber angle simultaneously with the components Fx, Fy, Fz and N.

The case in which the measurements are carried out on both sidewalls will now be considered.

Determination 3:

The intention is to estimate the components of the forces which are applied in the contact area, and the self-alignment torque, on the basis of measurements of the circumferential extension of both sidewalls of the tire, measured at two azimuths on each sidewall. The measurement azimuths are selected symmetrically with respect to the azimuth of the center of the contact area (180°+α° and 180°-α°). α must be different from $α_0$ if Fx is to be estimated. Let $V_1^1$ and $V_2^1$ be the values measured at these azimuths on the first sidewall, and $V_1^2$ and $V_2^2$ the values measured at these azimuths on the second sidewall.

With the aid of these four values, it is possible to determine the components by using division according to the azimuth-related and sidewall-related parities:

$V_1^1+V_2^1+V_1^2+V_2^2$ gives the azimuth-related and sidewall-related even component. This combination is therefore directly linked with Fz. An estimate of Fz is given by $f_z(a_1V_1^1+a_2V_2^1+b_1V_1^2+b_2V_2^2)$, where $a_1$, $a_2$, $b_1$ and $b_2$ are positive reals and $f_z$ is a continuous function. The coefficients $a_1$, $a_2$, $b_1$ and $b_2$ are, for example, determined so as to optimize the correlation coefficient between Fz and $a_1V_1^1+a_2V_2^1+b_1V_1^2+b_2V_2^2$.

$V_1^1+V_2^1-(V_2^1+V_2^2)$ gives the azimuth-related odd and sidewall-related even component. This combination is therefore directly linked with Fx. An estimate of Fx is given by $f_x(c_1V_1^1-c_2V_2^1+d_1V_1^2-d_2V_2^2)$, where $c_1$, $c_2$, $d_1$ and $d_2$ are positive reals and $f_x$ is a continuous function. The coefficients $c_1$, $c_2$, $d_1$ and $d_2$ are, for example, determined so as to optimize the correlation coefficient between Fx and $c_1V_1^1-c_2V_2^1+d_1V_1^2-d_2V_2^2$.

$V_1^1-V_1^2+(V_2^1-V_2^2)$ gives the azimuth-related even and sidewall-related odd component. This combination is therefore directly linked with Fy. An estimate of Fy is given by $f_y(e_1V_1^1+e_2V_2^1-f_1V_1^2-f_2V_2^2)$, where $e_1$, $e_2$, $f_1$ and $f_2$ are positive reals and $f_y$ is a continuous function. The coefficients $e_1$, $e_2$, $f_1$ and $f_2$ are, for example, determined so as to optimize the correlation coefficient between Fy and $e_1V_1^1+e_2V_2^1-f_1V_1^2-f_2V_2^2$.

$V_1^1-V_1^2-(V_2^1-V_2^2)$ gives the azimuth-related odd and sidewall-related odd component. This combination is therefore directly linked with N. An estimate of N is given by $f_n(g_1V_1^1-g_2V_2^1-h_1V_1^2+h_2V_2^2)$, where $g_1$, $g_2$, $h_1$ and $h_2$ are positive reals and $f_n$ is a continuous function. The coefficients $g_1$, $g_2$, $h_1$ and $h_2$ are, for example, determined so as to optimize the correlation coefficient between N and $g_1V_1^1-g_2V_2^1-h_1V_1^2+h_2V_2^2$.

This type of arrangement makes maximum use of the symmetries of the tire, and very good precision may be expected when reconstructing the components of the constraint applied in the contact area.

Determination 4:

The intention is to estimate the components of the forces which are applied in the contact area, and the self-alignment torque, on the basis of measurements of the circumferential extension of both sidewalls of the tire, measured at three azimuths on each sidewall. The measurement azimuths are selected in the following way:

Two azimuths selected symmetrically with respect to the azimuth of the center of the contact area (180°+α° and 180°-α°). Let $V_1^1$ and $V_2^1$ be the values measured at these azimuths on the first sidewall, and let $V_1^2$ and $V_2^2$ be the values measured at these azimuths on the second sidewall One azimuth corresponding to the center of the contact area. Let $V_c^1$ and $V_c^2$ be the values measured at these azimuths.

The processing is similar to that in Determination 3. The values $V_c^1$ and $V_c^2$ allow a certain redundancy of the information, but above all better estimation of the component Fz.

In the event that $\alpha$ is taken to be equal to $\alpha_0$, the information about Fz is obtained with the aid of $V_c^1$ and $V_c^2$, and the information about Fx, Fy and N is obtained using $V_1^1$, $V_1^2$, $V_2^1$ and $V_2^2$. An additional possibility for decoupling the various contributions is hence used.

Advantageously, with the view of refining the estimations of the components of the forces and of taking the non-linear behavior of the tire into account, the described method resorts to more sophisticated transfer functions for relating the measurements to the estimates of the forces. Any interpolation function making it possible to establish a link between the measured quantities and the values of the components of the applied constraint may be used in this context.

Although all the examples listed here use measurement azimuths which are selected so as to take maximum advantage of the symmetries of the tire and to facilitate reconstruction, the selection of the position of the azimuths at which the values are measured is free (symmetry of the azimuths is not obligatory per se), because any combination of a sufficient number of measurements makes it possible to estimate the components of the applied constraint. It is possible, in this case, to look directly for the functions giving the components Fx, Fy, Fz, N and $\gamma$ as a function of the measurements of circumferential extension of the sidewall or sidewalls, at known azimuths. The determination of the transfer functions is no longer based necessarily on analysis of the mechanics of the tire, but rather on the response of the tire, in terms of circumferential extension of the sidewall or sidewalls, to the forces which it experiences.

Whether the measurement azimuths are selected with the aid of a physical analysis or decided more arbitrarily, neural networks seem highly suitable for establishing a transfer function between the measurements which are carried out and the components of the forces Fx, Fy, Fz and N. Among the simplest applicable schemes, the use of networks having a layer of hidden neurons and a layer of output neurons may be adopted. These hidden neurons use a sigmoid transfer function. The output neurons, for their part, use a linear transfer function (FIG. 15). The parsimony property of this type of network, when used as an approximator, is very beneficial here. It is possible to use one network per component to be estimated, or a network that makes it possible to estimate all the components with the aid of a plurality of outputs.

If the measurement azimuths have been selected so as to take advantage of the symmetries or physical attributes, it may be beneficial to make linear combinations between the quantities before input into the network. In this case, a principal component analysis will make it possible to determine the coefficients of these combinations expediently, and will simplify the required neural network. The architecture described in FIG. 16 is obtained.

Specifically, the operation is carried out as follows:

The first step, after having determined the measurement azimuths, consists in collecting the values of the circumferential extension of the sidewall or sidewalls, during varied constraints of the tire which are selected so as to cover the full range in which evaluation of the forces will be permitted in normal use. The selected constraints also need to involve all the couplings liable to be encountered during normal use. The whole set of the measured values and the associated forces (obtained by another measurement means) constitute the training base.

The second step consists in training the weightings of the network over the base formed in this way. At the end of this phase, the transfer functions are obtained.

A third step consists in testing the transfer functions by comparing the estimates of the selected force components with the forces indicated by another measurement means.

Besides neural networks, it is possible to use polynomial functions, for example.

In the event that the inflation pressure of the tire is liable to change in the course of time, it may be very useful to take the pressure variations into account, depending on the precision desired for the measurement of the components in question.

A first procedure consists in correcting the estimated forces at the output of the transfer function as a function of the pressure. It is thus possible to carry out a first-order correction. To explain: let there be a constraint applied to the tire in the case of a transfer function which does not take the pressure into account. If the pressure is double the reference pressure (at which the transfer function was established), the transfer function will see about two times less measured deformations as input than for the reference pressure. It will therefore evaluate forces that are two times weaker than the forces actually being applied. The estimated forces should be multiplied by two.

The most precise approach, however, consists in introducing the pressure as a parameter in the transfer functions. This involves:

Training the transfer function or functions on a training base containing cases in which the tire is constrained under various conditions of inflation pressure covering the desired range of operation.

Providing a measurement or an estimate of the inflation pressure.

Without implying any limitation, two ways of knowing the pressure will be described below.

The first consists in using a pressure measurement given by a pressure sensor which is different from the specific sensors of the invention. The measured pressure value is then supplied to the system, in addition to the values of deformations at the azimuths being supplied to the transfer function or functions. FIG. 17a schematizes the associated architecture.

The second approach consists in estimating the inflation pressure on the basis of the measurements of circumferential deformation of the sidewalls. Indeed, the deformation signals have a structural component and a pneumatic component, which makes it possible to obtain information about the inflation pressure by analyzing them.

This approach requires determination of a transfer function which takes the measurements of deformation at the desired azimuths as its input, and which gives an estimate of the inflation pressure over the intended range of operation. The same methodology as that presented above is applicable:

Formation of a training base which mixes variations in applied forces and in inflation pressure.

Determination of a transfer function by training.

In practice, if the precision of a pressure determination performed as indicated above is deemed insufficient for a particular embodiment of the invention, it can be improved easily. Indeed, the change of the pressure in a tire is a phenomenon which is slow compared with the rotation of the tire. The pressure estimates can therefore be averaged or filtered so as to keep only the low-frequency components. A good estimate of the inflation pressure is then obtained. FIG. 17b schematizes the architecture which results from this approach. Besides knowledge of the resultants of forces in question, the method then provides an estimate of the inflation pressure without any additional sensor.

Naturally, many other variables (in addition to the measurements of circumferential extension) may be taken into account according to the same principle, in order to improve the efficiency of this determination (for example, the temperature of the tire).

In general, the number of measurement points may be more than the minimal configurations presented in the examples, and may permit a result which is more precise or more reliable because of the redundancy of the available information.

The measurement of the circumferential extension of the sidewall or sidewalls of the tire may be performed in any manner, using a device which is external to the tire or a device which is internal to the tire. By way of example, the use of one or more sensors which are placed in the tire, and which are therefore carried along in rotation by the tire, will be described here for measuring the circumferential extension.

This sensor or these sensors integrated into the tire, for example in a sidewall of the tire, and locally measuring the circumferential extension of the sidewall or sidewalls, may employ any physical measurement principle. They may, for example, involve dielectric sensors which measure a variation in capacitance linked with the distance separating two electrodes. The electrodes may consist of a conductive wire placed radially in the sidewall. This arrangement makes it possible to measure the "thread separation" by measuring the capacitance between the electrodes. If it is an active sensor, the sensor may be powered either by the vehicle, using wireless supply, or by a battery installed on the wheel or in the tire, or by any other means. Everything is also possible concerning the transmission of the information to the vehicle, using radio means or other the like. The sensor per se may deliver information continuously, or with a refresh frequency which is fast enough in relation to the period of rotation of the wheel.

This approach, using a sensor integrated into the tire, has the advantage of making it possible to ascertain the circumferential extension of the sidewall or sidewalls at all the azimuths of the tire since, when being carried along by the tire, a sensor explores all the azimuths during a rotation of the wheel.

The method of reconstructing the components of the forces being based on measuring the circumferential extension at certain azimuths, the problem of locating the sensor in order to extract the values at the correct azimuths is raised.

The sensor is interrogated at a constant and known frequency. It therefore delivers a time signal of the variation in the local circumferential extension. Such a measured signal is presented in FIG. 18. This time signal clearly demonstrates the signature of a wheel revolution which was observed previously (FIGS. 10a, 10b, 11a, 11b, 12a, 12b). Further to the signature of each wheel revolution, this signal contains noise. The first operation consists in reducing this noise by applying a low-pass filter, the cut-off frequency of which may be linked with the speed of rotation of the wheel.

Several possible cases may then arise, depending on the available equipment:

If a measurement of the angular position of the wheel is available, it is possible to know the instants at which the sensor passes through the measurement azimuth. Reading the values measured at these instants provides the value of the circumferential extension at the intended azimuths. This measurement of the angular position of the wheel may, for example, be obtained by counting the transitions of an ABS sensor recording the speed of rotation of the wheel.

If no external device is available to facilitate location of the sensor, only the signal of the sensor itself can be used. The invention proposes to use the signal of the sensor in order to estimate the angular position of the wheel.

Each passage of the sensor through the contact area has, as its signature, a very pronounced circumferential extension of the sidewalls of the tire. By using this observation, it is possible to find the instants at which the sensor passes through the center of the contact area. The simplest method of carrying out this operation consists in thresholding the filtered signal and in looking for the maxima among the values greater than this threshold (FIG. 19). This approach makes it possible to avoid detecting the maxima which do not correspond to a passage through the contact area.

Each time another passage through the contact area is determined, knowledge of the instants of the last passages (at least 3 passages) makes it possible to estimate the speed of rotation of the wheel and its acceleration. With the aid of these estimates, it is possible to reconstruct an evaluation of the azimuth at which the sensor lies as a function of time. It then becomes possible to extract the values at certain azimuths from the measurements as a function of time.

Several options are then available for implementing the measurement. Indeed, determination of the components of the forces requires measurements at a plurality of azimuths.

A first approach consists in using only one sensor on each sidewall for which measurements are intended to be obtained. At each passage through a required position, the value given by the sensor is taken into account in order to refresh the measurement at the azimuth in question. By making the assumption that the components of the forces vary slowly in relation to the speed of rotation of the wheel, a single sensor thus makes it possible to obtain the measurements at all the azimuths necessary for reconstruction of the forces. FIG. 20 presents this type of operation with a model (transfer function) which requires measurements at three azimuths (0°, 120° and 240°).

A second approach consists in providing a plurality of sensors over the circumference, so that, at least once per revolution, the sensors simultaneously lie at the azimuths where a measurement is intended to be carried out. It is thus possible to obtain an image of the deformation of the tire at various azimuths at a given instant, which no longer requires that the forces vary slowly in relation to the rotation of the wheel. One variant of this approach consists in arranging the sensors equally distributed around the tire. Hence, in the event that N sensors have been fitted, the situation in which the sensors are correctly positioned occurs at least N times per revolution. FIG. 21 presents this type of operation with three sensors, which arrive three times per revolution at the azimuths where the measurement is to be carried out (0°, 120° and 240°).

Lastly, it is possible to mix the approaches above.

Increasing the number of sensors makes it possible, in particular:

to increase the refresh frequency of the estimation of the forces, to increase the robustness with respect to rapid variations of the components of the forces which are applied in the contact area.

It should be noted that a plurality of models which take the measurements at different azimuths as their input may be determined. Even with a single sensor, it is thus possible to obtain a plurality of estimates during each wheel revolution. FIG. 22 gives an example in which three sensors are used. Two transfer functions are determined. The first uses measurements at 0°, 120° and 240°, and the second uses measurements at 60°, 180° and 300°. When the sensors arrive at the intended measurement positions, the transfer function can be applied. By suitably managing the sensors, it is even possible to make an estimate of the forces 6 times per wheel revolution in this type of arrangement. These estimates by a plurality of models may be averaged or compared in order to increase the precision and reduce the noise in the estimation of the forces.

FIG. 23 resumes the approach of the invention which sequentially combines estimation of the components of forces which are applied to the tire, on the basis of circumferential extension measurements, and estimation of the level of grip on the basis of these data.

The range D will be considered again. Its extent varies depending on the tires (and it may even not exist). In FIG. 9 it corresponds to a zone where there may be a plurality of quadruplets (Fx, Fy, Fz, μ) whose image under f is the same self-alignment torque N. It is consequently not possible to directly find an inverse function g over this range.

By using an encoding technique (for example, a semi-distributed encoding technique), it is nevertheless possible to propose a plurality of values of μ when a quadruplet Fx, Fy, Fz, N of this range is encountered. A probability may then be associated with each proposed value of μ. Although they enable the results to be improved, these methods nevertheless still present the problem of selecting the correct value of μ to be adopted.

Time-continuity properties may help in the selection. Let it be supposed that, in the course of time, the operating point of the tire-wheel assembly moves from range C to range B then D (FIG. 9). In ranges C and B, the estimate of μ was close to $\mu_1$. Let it be supposed that two values of μ are suddenly found to be possible in range D. By continuity, the value closest to $\mu_1$ may be selected by making the assumption that the ground surface could not change that quickly. If, however, the indeterminacy persists after a few additional evaluations, it may be true that the ground surface has changed. In this case, the value different from $\mu_1$ cannot be discounted. It is then necessary to make a selection again.

As can be seen, the existence of this non-invertible range in certain cases may make the method explained above difficult to use (for safety reasons, for example). Methods which definitively remove this indeterminacy are therefore particularly beneficial.

The movement of the point of application of the forces in the contact area may take place by a value dx along the X direction, or by a value dy along the Y direction. Measurement of only Fx, Fy, Fz and N does not make it possible to determine dx and dy independently. The result of this is an indeterminacy about the position, which indeterminacy may give rise to the problem of non-invertibility.

It has been possible to show that knowledge of additional information would enable the range D to be made invertible. The following approach will be considered by way of example. The self-alignment torque N can be divided up in the following way:

$$N = F_y \cdot dx - F_x \cdot dy = N_y - N_x,$$

dx and dy being the coordinates of the point of application of the resultant of the forces Fx and Fy.

The use of $N_x$ and $N_y$ instead of N makes it possible to find a function defined throughout the range of constraints creating a partial slip giving an estimate of μ. In this case, there is no ambiguity about the values of μ in the entire range. Knowing both $N_x$, $N_y$ and the forces makes it possible to locate the point of application of the forces in the contact area (the values of dx and dy above), and to derive μ from them.

In order to obtain the values of $N_x$ and $N_y$, the three torques L, M, N may for example be measured. (L: moment about the X-axis, M moment about the Y-axis and N about Z). The values of dx, dy and dz are then obtained as the solution of a linear system. Specifically, the following can be written if dx and dy are the coordinates of the point of application of the force:

$$L = F_z \cdot dy - F_y \cdot dz \qquad \text{i.}$$

$$M = F_x \cdot dz - F_z \cdot dx \qquad \text{ii.}$$

$$N = F_y \cdot dx - F_x \cdot dy \qquad \text{iii.}$$

If the camber angle is assumed to be small, dz is very closely linked with the load Fz of the tire. It is also possible to take into account the corrections to be introduced as a function of the applied forces Fx and Fy. For a given tire under known conditions (pressure), the relationship dz=f (Fx, Fy, Fz, P) is known with fairly high precision, for example by means of an approximation function such as a neural network.

In the case of a constraint principally in the direction Fx, the second relation is used in order to obtain $$dx = \frac{Fx \cdot dz - M}{Fz},$$

dy is then obtained by the third relation $$dy = \frac{Fy \cdot dx - N}{Fx},$$

In the case of a constraint principally in the direction Fy, the first relation is used in order to obtain $$dy = \frac{L + Fy \cdot dz}{Fz},$$

dx is then obtained by the third relation $$dx = \frac{N + Fx \cdot dy}{Fy}.$$

In the case of coupled constraints, it is possible to use one or other of the relations, or both of them in order to increase accuracy. Knowing dx and dy, the possible indeterminacy is removed.

The particular embodiment of the proposed method of estimating the maximum grip coefficient requires that the tire be constrained by forces Fx, Fy, or both combined. In fact, the approach presented above presupposes that there is a slip region in the contact area. By virtue of this method, an estimate of the grip limit is obtained before the latter is reached. When the tire is being constrained very little (lack of slip in the contact area) however, the estimation is more problematic or, at least, it is preferably accompanied by a confidence index determined by training as indicated below.

In a training phase, in addition to the model $\mu=g(Fx, Fy, Fz, N, \ldots)$, a model $N_{grip}=f(Fx, Fy, Fz, \ldots)$ is determined which represents the value of N when the tire is gripping perfectly ($\mu$ very large);

In a use phase, Fx, Fy, Fz and N are estimated with the aid of the circumferential extension measurement. Fx, Fy and Fz make it possible to determine Ngrip. A confidence index is estimated by selecting a threshold and by comparing N and $N_{grip}$ as follows:

If $|N|-|N_{grip}|<$Threshold, then the contact of the tire on the ground is deemed to be gripping, and the determination of $\mu$ is deemed to be unreliable.

If $|N|-|N_{grip}|>$Threshold, then the slip zone in the contact is sufficient and the estimate of $\mu$ is reliable.

A threshold value of the order of 1 m.daN for a passenger car tire makes it possible to determine with sufficient reliability whether the model is usable. This value corresponds to using the model on the basis of a percentage use of the maximum potential of the order of 50%.

In order to obtain a correctly evaluated quantity starting from low constraints, it is proposed to consider the percentage grip potential being used, which is defined in the following way:

$$p_u = \frac{\mu_{utilisè}}{\mu} = \frac{\sqrt{F_x^2 + F_y^2}}{\mu.F_z}$$

This quantity has the benefit of being easier to estimate correctly as an absolute value regardless of the constraint, even if it is small, being applied to the tire. It is obtained directly, for example using a neural network, by applying the approach presented for the estimation of $\mu$. FIG. 19 presents an example of reconstructing the maximum grip potential and the percentage potential used. The driving or braking torque (slip associated with Fx) and the transverse force (drift associated with Fy) vary as a function of time as well as the ground surface on which the vehicle is driving. The load Fz is imposed. When the constraint of the tire is small (Fx and Fy simultaneously small), for example at time 4 s, the quality of the estimate of the maximum grip potential drops. The estimate of the percentage of potential used, for its part, remains quite correct.

In this case, a particular embodiment of the proposed method consists in establishing a transfer function between the measurements, the three components of a resultant of forces which are exerted by the road on the contact area of a tire and the self-alignment torque generated by the tire, and the percentage of grip potential being used, which is defined by $$p_u = \frac{\mu_{used}}{\mu} = \frac{\sqrt{F_x^2 + F_y^2}}{\mu.F_z},$$

by the following steps:

compiling a data base containing Fx, Fy, Fz, N and $p_u$ for a set of constraints of the tire on ground surfaces having different grip coefficients, the parameters Fx, Fy, Fz, N and $\mu$ being imposed on the tire, the value of the self-alignment torque N being measured, by training, determining the weightings of a neural network making it possible to reconstruct $p_u$ directly on the basis of knowledge of Fx, Fy, Fz and N.

In the context of use by a system fitted on-board a vehicle (a mechatronic system, for example of the ESP or ABS type), it is beneficial to have available a quantity defined throughout the range of use. It is, for example, conceivable to employ the percentage of grip potential being used, in order to refine the control mechanisms of ABS or ESP systems.

What is claimed is:

1. A method of determining a grip coefficient $\mu$ in a contact area of a tire on a road, comprising the steps of:
   determining signals representative of each of three components of a resultant of forces which are exerted by the road on the contact area of the tire and a signal representative of a self-alignment torque generated by the tire, and
   processing the signals representative of the three components of the resultant of forces which are exerted by the road on the contact area of the tire and the signal representative of the self-alignment torque generated by the tire, to extract the grip coefficient $\mu$ therefrom.

2. The method according to claim 1, wherein the step of determining the signals representative of the three components of the resultant of forces which are exerted by the road on the contact area of the tire and the signal representative of the self-alignment torque generated by the tire comprises the steps of:
   selecting a plurality of fixed points, which points each lie at different azimuths along a circumference in at least one sidewall of the tire,
   measuring a corresponding number of circumferential distance variations at these fixed points when the tire is rolling on the road to produce distance variation signals, and
   processing the distance variation signals to extract the signals representative of the three components of the resultant of forces which are exerted by the road on the contact area of the tire and the signal representative of the self-alignment torque generated by the tire.

3. The method according to claim 2, in which the determination of the signals representative of the three components of the resultant of forces which are exerted by the road on the contact area of the tire and the signal representative of the self-alignment torque generated by the tire further comprises the steps of:
   obtaining at least five measurements of circumferential distance variation in at least one sidewall of the tire at five fixed points in space which lie at different azimuths along the circumference, and deriving the grip coefficient μ from the extracted signals representative of the three components of the resultant of forces which are exerted by the road on the contact area of the tire and of the signal representative of the self-alignment torque generated by the tire.

4. The method according to claim 2, wherein the step of measuring the circumferential distance variations is carried out by at least one sensor integrated in a sidewall of the tire, and a signal from the sensor is processed to read a value of the signal at a plurality of azimuths corresponding to the fixed points.

5. The method according to claim 2, wherein the step of measuring the circumferential distance variations is carried out by a plurality of sensors equal in quantity to a quantity of azimuths being observed, the sensors being external to the tire and arranged at fixed positions.

6. The method according to claim 2, further comprising the step of establishing a transfer function between the measurements of circumferential distance variation, the three components of the resultant of forces which are exerted by the road on the contact area of the tire, and the self-alignment torque generated by the tire, and wherein a maximum grip coefficient is determined by the steps of:
  compiling a data base containing Fx, Fy, Fz, N and μ for a set of constraints of the tire on ground surfaces having different grip coefficients, the parameters Fx, Fy, Fz, and μ being imposed on the tire, a value of the self-alignment torque N being measured, and
  training a neural network for determining weightings of the neural network to reconstruct μ on the basis of knowledge of Fx, Fy, Fz and N.

7. The method according to claim 2, further comprising the step of establishing a transfer function between the measurements of circumferential distance variation, the three components of the resultant of forces which are exerted by the road on the contact area of the tire, and the self-alignment torque generated by the tire, and a percentage of grip potential being used,
  wherein the percentage of grip being used is defined by $$p_u = \frac{\mu_{used}}{\mu} = \frac{\sqrt{F_x^2 + F_y^2}}{\mu \cdot F_z},$$

and comprising the steps of:
  compiling a data base containing Fx, Fy, Fz, N and $p_u$, for a set of constraints of the tire on ground surfaces having different grip coefficients, the parameters Fx, Fy, Fz, and μ being imposed on the tire, a value of the self-alignment torque N being measured, and
  training a neural network for determining weightings of the neural network to reconstruct $p_u$, directly on the basis of knowledge of Fx, Fy, Fz and N.

8. The method according to claim 2, wherein a transfer function is established between the measurements of circumferential distance variation, the three components of the resultant of forces which are exerted by the road on the contact area of the tire and the self-alignment torque generated by the tire, and a maximum grip coefficient by the steps of:
  compiling a data base containing Fx, Fy, Fz, N and μ for a set of constraints of the tire on ground surfaces having different grip coefficients, the parameters Fx, Fy, Fz, and μ being imposed on the tire, a value of the self-alignment torque N being measured,
  calculating reduced values $$\frac{Fx}{Fz}, \frac{Fy}{Fz}, \frac{N}{Fz},$$

and training a neural network for determining weightings of the neural network to reconstruct μ on the basis of knowledge of $$\frac{Fx}{Fz}, \frac{Fy}{Fz}, \frac{N}{Fz}.$$

9. The method according to claim 2, in which setting $$N = F_y \cdot dx - F_x \cdot dy = N_y - N_x$$

where dx is a distance from the point of application of the force Fy to the vertical plane which passes through the center of the contact area and is orthogonal to the X axis, and
  where dy is a distance from the point of application of the force Fx to the vertical plane which passes through the center of the contact area and is orthogonal to the Y axis, and
  the method includes the step of obtaining values of $N_x$ and $N_y$ from the measurements of three torques L, M, N, L being the moment about the X axis, M being the moment about the Y axis and N being the moment about the Z axis.

10. The method according to claim 2, wherein the circumferential distance variation is determined by measuring a distance between the threads of a carcass ply in the sidewalls of the tire.

11. The method according to claim 2, wherein the circumferential distance variation is determined by measuring a distance between wires forming a sensor, the sensor measuring a variation in capacitance linked with the distance separating the wires.

12. The method according to claim 2, wherein at least three fixed points are used, which points are defined such that:
  one point corresponds to one of an azimuth of the center of the contact area or an azimuth of the point opposite to the contact area, and,
  two other points are symmetrical with respect to a vertical plane passing through the center of the contact area.

13. The method according to claim 2, wherein measurement azimuths are selected symmetrically with respect to an azimuth of the center of the contact area (180°+α° and 180°−α°), with α different from $α_0$, where $α_0$ is an azimuth at the entry of the contact area, $V_1^1$ and $V_2^1$ being values measured at these azimuths on a first sidewall and $V_1^2$ and $V_2^2$ being values measured at these azimuths on a second sidewall, the method comprising the steps of:
  estimating a component Fz by $f_z(a_1 V_1^1 + a_2 V_2^1 + b_1 V_1^2 + b_2 V_2^2)$, where $a_1$, $a_2$, $b_1$ and $b_2$ are positive real coefficients and $f_z$ is a continuous function,
  estimating a component Fx by $f_x(c_1 V_1^1 - c_2 V_2^1 + d_1 V_1^2 - d_2 V_2^2)$, where $c_1$, $c_2$, $d_1$ and $d_2$ are positive real coefficients and $f_X$ is a continuous function,
  estimating a component Fy by $f_y(e_1 V_1^1 + e_2 V_2^1 + f_1 V_1^2 - f_2 V_2^2)$, where $e_1$, $e_2$, $f_1$ and $f_2$ are positive real coefficients and $f_y$ is a continuous function, and estimating the self-alignment torque N by $f_n(g_1V_1^1 - g_2V_2^1 - h_1V_1^2 + h_2V_2^2)$, where $g_1$, $g_2$, $h_1$ and $h_2$ are positive real coefficients and $f_n$ is a continuous function.

14. The method according to claim 2, wherein measurement azimuths are selected symmetrically with respect to an azimuth of the center of the contact area (180°+α° and 180°−α°), with α not equal to $\alpha_0$, where $\alpha_0$ is an azimuth at the entry of the contact area, and $V_1$ and $V_2$ being values measured at these other azimuths, the method comprises the steps of:

estimating a value Fx by $f_x(V_2 - rV_1)$, where r is a positive real coefficient and $f_x$ is a continuous function, estimating a value Fz by $f_z(V_c - (s_1V_1 + s_2V_2))$, where $s_1$ and $s_2$ are positive real coefficients and $f_z$ is a continuous function, and, estimating a value Fy by $f_y(V_c + u_1V_1 + u_2V_2)$, where $u_1$ and $u_2$ are positive real coefficients and $f_y$ is a continuous function.

15. The method according to claim 2, wherein a confidence index is determined by the steps of:

determining in a training phase a model $\mu = g(Fx, Fy, Fz, N, \ldots)$ and a model $N_{grip} = f(Fx, Fy, Fz, \ldots)$ representing a value of N when the tire is gripping perfectly;

estimating in a use phase Fx, Fy, Fz and N with the aid of the circumferential extension measurement, and determining Ngrip;

responsive to $|N| - [N_{grip}]$ being less than a threshold value, determining that the contact of the tire on the ground is gripping, and that a determination of μ is unreliable; and, responsive to $|N| - [N_{grip}]$ being greater than the threshold, determining that a slip zone in the contact is sufficient and an estimate of μ is reliable.

\* \* \* \* \*